US012658523B2

(12) United States Patent
Han et al.

(10) Patent No.: US 12,658,523 B2
(45) Date of Patent: Jun. 16, 2026

(54) LITHIUM SECONDARY BATTERY

(71) Applicant: LG Energy Solution, Ltd., Seoul (KR)

(72) Inventors: Woo Ri Han, Seoul (KR); Kwan Soo Lee, Seoul (KR); Do Gyun Kim, Seoul (KR); Kwang Su Hwang Bo, Seoul (KR); Hangsoo Shin, Seoul (KR); Myung An Lee, Seoul (KR); Jong Hoon Park, Seoul (KR); Jae Young Woo, Seoul (KR); Sanghak Chae, Seoul (KR); Sangjin Park, Seoul (KR); Kwang Hun Ko, Seoul (KR); Junsu Lee, Seoul (KR); Wonyoung Choi, Seoul (KR); Jungjin Kim, Seoul (KR); Hongjae Kim, Seoul (KR); Mingu Park, Seoul (KR); Heeji Back, Seoul (KR); Uirim Son, Seoul (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/990,416

(22) Filed: Dec. 20, 2024

(65) Prior Publication Data

US 2025/0210798 A1      Jun. 26, 2025

(30) Foreign Application Priority Data

Dec. 22, 2023    (KR) ........................ 10-2023-0189919
Nov. 22, 2024    (KR) ........................ 10-2024-0169074

(51) Int. Cl.
*H01M 50/342* (2021.01)
*H01M 10/04* (2006.01)
(Continued)

(52) U.S. Cl.
CPC ... *H01M 50/3425* (2021.01); *H01M 10/0431* (2013.01); *H01M 10/052* (2013.01);
(Continued)

(58) Field of Classification Search
CPC ........... H01M 50/107; H01M 50/3425; H01M 50/342–3425; H01M 50/578
See application file for complete search history.

(56) References Cited

U.S. PATENT DOCUMENTS

2022/0231345 A1*  7/2022  Hwangbo ........... H01M 50/545
2022/0416338 A1*  12/2022  Nogami ............. H01M 50/578
(Continued)

FOREIGN PATENT DOCUMENTS

CN        216597872 U      5/2022
JP        2016-091711 A    5/2016
(Continued)

OTHER PUBLICATIONS

International Search Report for Application No. PCT/KR2024/020976 mailed Apr. 9, 2025, 3 pages, [See p. 2, categorizing the cited references].

*Primary Examiner* — Robert S Carrico
(74) *Attorney, Agent, or Firm* — Lerner David LLP

(57) ABSTRACT

A lithium secondary battery may include a battery can, an electrode assembly and an electrolyte received in the battery can, and a cap plate to seal the battery can. The battery can includes a first end portion and a second end portion opposite the first end portion. The lithium secondary battery is configured so at least a portion of the electrode assembly is ejected through the first end portion of the battery can when an internal pressure within the battery can is 21 kgf/cm² or more. After the portion of the electrode assembly is ejected through the first end portion, a distance from an end portion of the electrode assembly located farthest away from the battery can to the second end portion of the battery can is greater than or equal to 1.25 times a distance between the first end portion and the second end portion of the battery can.

20 Claims, 15 Drawing Sheets

WINDING DIRECTION 211    210    212

Z
X

(51) Int. Cl.

| | |
|---|---|
| *H01M 10/052* | (2010.01) |
| *H01M 10/0525* | (2010.01) |
| *H01M 10/0587* | (2010.01) |
| *H01M 50/107* | (2021.01) |
| *H01M 50/152* | (2021.01) |
| *H01M 50/167* | (2021.01) |
| *H01M 50/186* | (2021.01) |
| *H01M 50/193* | (2021.01) |
| *H01M 50/383* | (2021.01) |
| *H01M 50/533* | (2021.01) |
| *H01M 50/578* | (2021.01) |

(52) U.S. Cl.

CPC ... *H01M 10/0525* (2013.01); *H01M 10/0587* (2013.01); *H01M 50/107* (2021.01); *H01M 50/152* (2021.01); *H01M 50/167* (2021.01); *H01M 50/186* (2021.01); *H01M 50/193* (2021.01); *H01M 50/383* (2021.01); *H01M 50/533* (2021.01); *H01M 50/578* (2021.01); *H01M 2220/20* (2013.01)

(56) References Cited

U.S. PATENT DOCUMENTS

| | | | | |
|---|---|---|---|---|
| 2023/0079718 A1* | 3/2023 | Ko | .................. | H01M 50/213 |
| | | | | 429/99 |
| 2023/0318099 A1 | 10/2023 | Doo et al. | | |
| 2024/0266693 A1 | 8/2024 | Won et al. | | |

FOREIGN PATENT DOCUMENTS

| | | | | | |
|---|---|---|---|---|---|
| KR | 100749650 | B1 * | 8/2007 | ........ | H01M 10/0587 |
| KR | 20130033715 | A | 4/2013 | | |
| KR | 2017-0070542 | A | 6/2017 | | |
| KR | 20190033900 | | 4/2019 | | |
| KR | 2019-0094828 | A | 8/2019 | | |
| KR | 102308423 | B1 | 10/2021 | | |
| KR | 20220023100 | A | 3/2022 | | |
| KR | 20220107132 | A | 8/2022 | | |
| KR | 20230037895 | A | 3/2023 | | |
| KR | 2023-0078926 | A | 6/2023 | | |
| WO | WO-2023244658 | A1 * | 12/2023 | | |
| WO | WO-2024046974 | A1 * | 3/2024 | ........ | H01M 50/3425 |

* cited by examiner

FIG. 4

LITHIUM SECONDARY BATTERY

CROSS-REFERENCE TO RELATED APPLICATIONS

This application claims priority to Korean Patent Application No. 10-2023-0189919, filed on Dec. 22, 2023, and Korean Patent Application No. 10-2024-0169074, filed on Nov. 22, 2024, the disclosures of each of which are incorporated by reference herein in their entirety.

TECHNICAL FIELD

The present disclosure relates to a lithium secondary battery. More particularly, the present disclosure relates to a lithium secondary battery having a structure in which an electrode assembly is received in a battery can.

BACKGROUND

Recently, with the development of electric vehicle technology, the demand for high capacity batteries is increasing, and there is a need for development of large cylindrical batteries having high volume. Such batteries are drawing attention as a energy source for enhancing environmental friendliness and energy efficiency in that the use of fossil fuels can be reduced greatly and that no byproduct is generated during energy consumption.

In the case of commonly used small cylindrical batteries, i.e., cylindrical batteries having 1865 or 2170 form factor, resistance or heat generation does not have a great influence on battery performance due to low capacity. However, when the specifications of small cylindrical batteries are applied to large cylindrical batteries, serious problems with battery safety may occur.

As the size of a battery increases, the amount of heat and gas generated in the battery increases as well. Due to the heat and gas, temperature and pressure in the battery increases, causing fire or explosion in the battery. To prevent this, it is necessary to properly release the heat and gas inside the batteries to the atmosphere. To this end, the cross-sectional area of the battery, as a passage for releasing the heat out of the battery, needs to be increased with increasing volume. However, because the increase in cross-sectional area is generally less than the increase in volume as the batteries increases in size, the amount of heat generated in the batteries increases and the consequential explosion risk increases, while the output decreases. Additionally, during fast charging at high voltage, a large amount of heat may be generated near electrode tabs in a short time, which may cause fire in the batteries.

To prevent fire or explosion risks, according to the conventional art, secondary batteries are equipped with safety devices. As an example, cylindrical secondary batteries may generally have vent portions. According to the conventional art, when the internal pressure of a secondary battery rises, the vent portions move up and their parts are ruptured to form paths for the release of gas, and gas inside the secondary battery is released to the atmosphere, thereby preventing explosion risks.

However, even when the vent portions are open, the side rupture of the battery can may occur. When it is used in a vehicle, the cylindrical lithium secondary battery is applied to the vehicle in the form of a battery pack in which a plurality of cylindrical lithium secondary batteries are coupled to each other. The side rupture of a battery can lead to continuous flame spread to adjacent other unit cells within the battery pack.

SUMMARY

Technical Problem

The present disclosure is directed to a battery having high volume for high capacity and high safety by reducing or preventing side rupture of a battery can when the internal pressure of the battery can rises in the lithium secondary battery.

Additionally, by reducing or preventing the side rupture of the battery can, aspects of the present disclosure may reduce the influence of any one battery on adjacent other batteries in a battery pack including a plurality of batteries. This may greatly improve the safety of the battery pack and a vehicle including the batteries.

Accordingly, the present disclosure relates to a lithium secondary battery, a battery pack, and a vehicle with improved safety.

Technical Solution

An aspect of the present disclosure provides a lithium secondary battery including a battery can, an electrode assembly and an electrolyte received in the battery can, and a cap plate configured to seal the battery can, wherein the battery can comprises a first end portion and a second end portion opposite the first end portion, wherein the lithium secondary battery is configured such that at least a portion of the electrode assembly is ejected through the first end portion of the battery can when an internal pressure within the battery can is 21 kgf/cm$^2$ or more, and wherein after the portion of the electrode assembly is ejected through the first end portion of the battery can, a distance from an end portion of the electrode assembly located farthest away from the battery can to the second end portion of the battery can is greater than or equal to 1.25 times a distance between the first end portion and the second end portion of the battery can.

According to an aspect, the lithium secondary battery is configured such that the portion of the electrode assembly is ejected through the first end portion of the battery can without or before thermal runaway of the lithium secondary battery or without or before side rupture of the battery can.

According to an aspect, the first end portion of the battery can includes a vent portion, or the cap plate is secured to the first end portion of the battery can, and the cap plate includes a vent portion. Here, the lithium secondary battery is configured such that the portion of the electrode assembly may be ejected through the first end portion of the battery can after destruction of a structure for securing the cap plate to the first end portion of the battery can or after rupture of the vent portion.

According to an aspect, the cap plate includes a vent portion, and the vent portion is configured to rupture when the internal pressure is 21 kgf/cm$^2$ or more. According to an aspect, the vent portion may be configured to rupture when the internal pressure is more than 25 kgf/cm$^2$ and less than 29 kgf/cm$^2$.

According to an aspect, a ratio of a maximum width in a cross section of the electrode assembly in a direction perpendicular to a winding axis to a maximum width in a cross section of the battery can in the direction perpendicular to the winding axis is less than 1.

According to an aspect, the lithium secondary battery includes a first current collector plate between the first end portion of the battery can and the electrode assembly.

According to an aspect, the first current collector plate may have a battery can coupling portion having a tapered structure.

According to an aspect, a flame release area may range from 30% to 50% based on a total open area of the first end portion of the battery can.

According to an aspect, a ratio of form factor (a diameter-to-height ratio) of the lithium secondary battery may be 0.4 or more. For example, the lithium secondary battery may be a 46110 cell, a 4875 cell, a 48110 cell, a 4880 cell, a 4680 cell, or a 4695 cell.

According to an aspect, the electrode assembly is cylindrical in shape.

According to an aspect, a thickness of a side of the battery can ranges from 0.1 mm to 0.4 mm.

According to an aspect, the electrode assembly is a jellyroll-type electrode assembly including a positive electrode plate and a negative electrode plate wound with a separator interposed between the positive electrode plate and the negative electrode plate, and wherein after the portion of the electrode assembly is ejected through the first end portion of the battery can, the electrode assembly has a spiral structure.

According to an aspect, a sealing tape including polypropylene is attached to an outermost end portion of the electrode assembly.

According to an aspect, the positive electrode plate and the negative electrode plate each includes an uncoated portion where an active material layer is not formed, and at least part of the uncoated portion of the positive electrode plate or the negative electrode plate defines an electrode tab.

According to an aspect, the positive electrode plate uncoated portion and the negative electrode plate uncoated portion are respectively formed at an end portion of the positive electrode plate and the negative electrode plate along a direction in which the electrode assembly is wound, a first current collector plate is coupled to the positive electrode plate uncoated portion and a second current collector plate is coupled to the negative electrode plate uncoated portion, and the first current collector plate and the second current collector plate are each connected to an electrode terminal.

According to an aspect, each of the positive electrode plate uncoated portion and the negative electrode plate uncoated portion is shaped into a plurality of independently bendable segments, and at least part of the plurality of independently bendable segments are bent toward a winding center of the electrode assembly.

According to an aspect, the at least part of the plurality of independently bendable segments are overlapped on a top of the electrode assembly or a bottom of the electrode assembly, and the first current collector plate and the second current collector plate are each coupled to the plurality of overlapped segments.

An aspect of the present disclosure provides a battery pack including the lithium secondary battery according to the above-described aspects.

An aspect of the present disclosure provides an electric vehicle including the battery pack as a power source.

Advantageous Effects

The lithium secondary battery according to aspects of the present disclosure may prevent rupture of the side portion of the battery can or local occurrence of flames at weak or vulnerable elements in the battery can before the rupture of the battery can due to the internal pressure rise within the battery can. Specifically, it may be possible to prevent rupture of the side portion of the battery can by configuring the electrode assembly to be ejected through one end portion of the battery can without or before the rupture of the side portion of the battery can due to increased pressure within the battery can. Accordingly, it may be possible to reduce the influence of any one battery on adjacent batteries in a battery pack including a plurality of batteries. This may prevent the spread of fire through the batteries. Additionally, it may be possible to prevent local occurrence of flames at weak or vulnerable elements in the battery can by configuring the electrode assembly to be ejected out of the battery can without or before the occurrence of flames in the battery can.

Accordingly, it may be possible to provide a lithium secondary battery with improved safety and a battery pack and a vehicle including the same. Additionally, due to such improved safety of the battery, other safety measures may be relaxed. For example, cost savings and improved process efficiency can be expected by reducing the thickness of the battery can that has been conventionally designed with a large thickness to improve safety.

BRIEF OF DESCRIPTION OF THE DRAWINGS

The accompanying drawings illustrate aspects of the present disclosure and together with the following detailed description, serve to provide a better understanding of the technical aspects of the present disclosure. Thus, the present disclosure should not be construed as being limited to the drawings.

FIG. 4 is a diagram showing the electrode assembly after winding according to an aspect of the present disclosure.

DETAILED DESCRIPTION

Figure 1A:
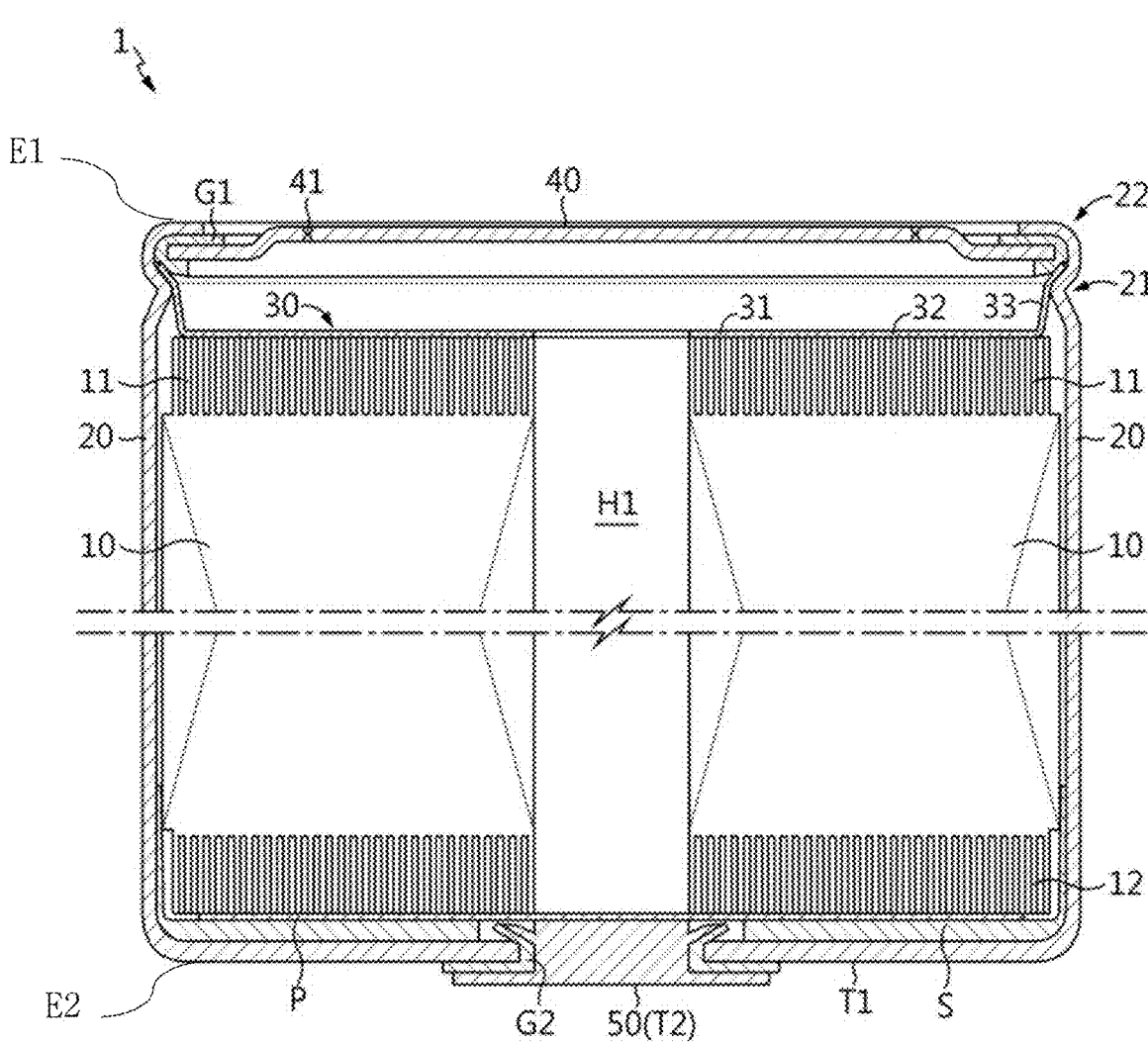
FIG. 1A shows a vertical cross section structure of a lithium secondary battery according to an aspect of the present disclosure.

Hereinafter, aspects of the present disclosure will be described in detail with reference to the accompanying drawings. Prior to the description, it should be understood that the terms or words used in the disclosure and the appended claims should not be construed as being limited to general and dictionary meanings, but rather interpreted based on the meanings and concepts corresponding to the technical aspect of the present disclosure on the basis of the principle that the inventor is allowed to define the terms appropriately for the best explanation. Therefore, the aspects described herein and the illustrations shown in the drawings are exemplary aspects of the present disclosure to describe the technical aspects of the present disclosure and are not intended to be limiting. It should be understood that a variety of other equivalents and modifications could have been made thereto at the time the application was filed.

Additionally, to help the understanding of the present disclosure, the accompanying drawings may illustrate some elements in exaggerated dimensions, not in actual scale. Furthermore, the same element in different drawings may be given the same reference numeral.

Although the terms "first", "second" and the like, are used to describe various elements, these elements are not limited by the terms. These terms are used to distinguish one element from another, and unless expressly stated otherwise, a first element may be a second element.

Throughout the disclosure, each element may be singular or plural unless expressly stated otherwise.

When an element is referred to as being present "on (or below)" another element, it can be placed in contact with a surface, such as an upper surface or a lower surface, of the other element, or intervening elements may be present.

Additionally, when an element is "connected to", "coupled to," or "linked to" another element, it should be understood that they can be directly connected or linked to each other, but intervening elements may be present, or each element may be "connected to", "coupled to," or "linked to" each other through another element.

In the specification, "A and/or B" refers to either A or B or both unless expressly stated otherwise. Additionally, "C to D" refers to C or more and D or less unless expressly stated otherwise.

For convenience of description, in the disclosure, a direction following a length direction of a winding axis of an electrode assembly wound in a jellyroll style is referred to as an axial direction Y. Additionally, a direction around the winding axis is referred to as a peripheral direction or a circumferential direction X. Additionally, a direction facing toward the winding axis or facing away from the winding axis is referred to as a radial direction. Among them, in particular, the direction facing toward the winding axis is referred to as a centripetal direction, and the direction facing away from the winding axis is referred to as a centrifugal direction.

Figure 1B:
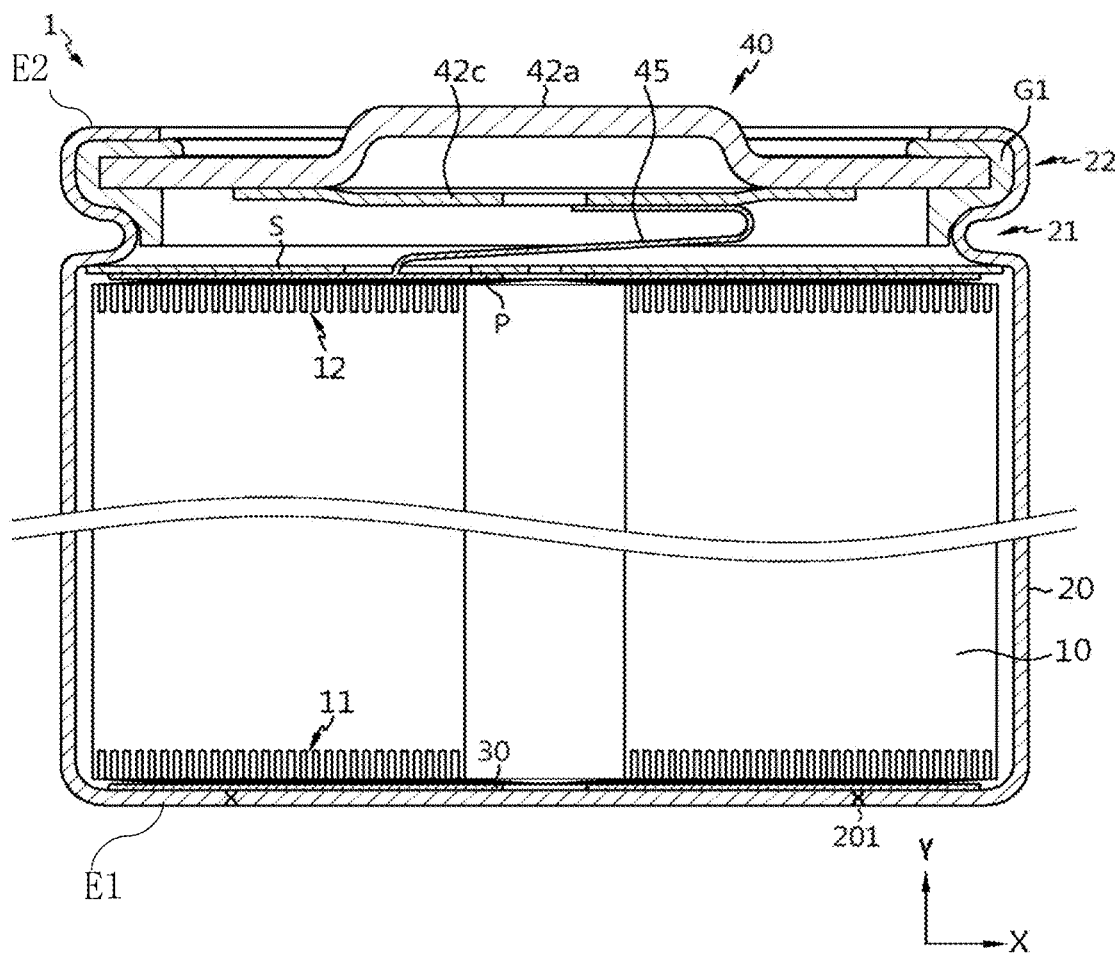
FIG. 1B shows a vertical cross section structure of a lithium secondary battery according to an aspect of the present disclosure.

FIGS. 1A and 1B each show a vertical cross section structure of a lithium secondary battery 1 according to aspects of the present disclosure.

The lithium secondary battery 1 of FIG. 1A or 1B includes a battery can 20, an electrode assembly 10, an electrolyte (not shown) and a cap plate 40. The battery can 20 has a first end portion E1 and a second end portion E2 opposite the first end portion E1. In the present disclosure, the two opposite end portions of the battery can 20 are referred to as the first end portion E1 and the second end portion E2, and a part connecting the first end portion E1 to the second end portion E2 and surrounding the electrode assembly is referred to as a side portion of the battery can 20. When the electrode assembly 10 is a jellyroll type, the two ends of the battery can 20 in the axial direction Y of the winding axis are the first end portion E1 and the second end portion E2, and the part of the battery can surrounding the electrode assembly in the circumferential direction X of the winding axis is referred to as the side portion of the battery can.

At least one of the first end portion E1 or the second end portion E2 includes at least one opening portion. Any one of the first end portion E1 and the second end portion E2 may include the opening portion. According to some aspects of the present disclosure, both the first end portion E1 and the second end portion E2 may include the opening portion. The electrode assembly 10 and the electrolyte may be received in the battery can 20 through the opening portion included in at least one of the first end portion E1 or the second end portion E2. After the electrode assembly 10 and the electrolyte are received in the battery can 20, the opening portion of at least one of the first end portion E1 or the second end portion E2 may be closed by the cap plate 40. FIG. 1A shows that the opening portion and the cap plate 40 are present at the first end portion E1 of the battery can 20. FIG. 1B shows that the opening portion and the cap plate 40 are present at the second end portion E2 of the battery can 20.

FIGS. 1A and 1B show the cylindrical battery 1, but the present disclosure is not limited by the shape of the battery, and may be applied to batteries of any other shapes, for example, prismatic batteries.

Referring to FIG. 1A, the battery 1 may further include one or more of a terminal 50, a sealing gasket G1, an insulation gasket G2, a current collector plate 30, p, or an insulator S. Referring to FIG. 1B, the battery 1 may further include one or more of a current collector plate 30, P, an insulator S, or a lead 45.

According to need, the battery can 20 may have a beading portion 21 and a crimping portion 22 at the upper end, as a structure for securing the cap plate 40 to the first end portion E1 or the second end portion E2 of the battery can 20. The beading portion 21 may be formed by beading the circumference of the outer peripheral surface of the battery can 20 toward a winding center axis. The beading portion 21 may prevent the electrode assembly 10 accommodated in the battery can 20 from slipping out through the opening portion of the battery can 20 during storage or normal charging/discharging of the lithium secondary battery, and act as a support on which the cap plate 40 is mounted.

The crimping portion 22 may be formed on the beading portion 21, and is extended and bent to surround the outer peripheral surface of the cap plate 40 disposed on the beading portion 21 and a part of the upper surface of the cap plate 40.

The cap plate 40 is used to seal the open end portion of the battery can 20, for example, the first end portion E1 or the second end portion E2. The cap plate 40 may include a sealing gasket G1 that provides sealability between the cap plate 40 and the battery can 20. The gasket G1 may have an insulating property. Referring to FIG. 1B, the cap plate 40 may further include a connection plate 42c electrically and mechanically coupled to the cap plate 40. For example, the cap plate 40 may be compressed onto the beading portion 21 of the battery can 20, and secured by the crimping portion 22. The first gasket G1 may be interposed between the cap plate 40 and the crimping portion 22 to ensure sealability of the battery can 20 and electrical insulation between the battery can 20 and the cap plate 40.

The cap plate 40 may include any material and structure for covering the opening portion of the first end portion E1 or the second end portion E2 of the battery can 20 without limitation.

When the cap plate 40 is made of metal having electrical conductivity, the cap plate 40 may be electrically connected to a positive or negative electrode plate of the electrode assembly 10. In such aspects, the cap plate 40 may be electrically isolated from the battery can 20 through the sealing gasket G1. In this case, the cap plate 40 may act as a positive or negative terminal of the lithium secondary battery. Referring again to FIG. 1B, the cap plate 40 may have a protruding portion 42a protruded upward from the winding center C. When the protruding portion contacts an external power source, an electric current from the external power source may be applied. The protruding portion may be exposed to the outside of the lithium secondary battery for the contact with the external power source, and the degree of protrusion may be designed according to need. For example, as shown in FIG. 1A, the protruding portion may be protruded to a location corresponding to the end portion (the first end portion E1) of the battery can, or as shown in FIG. 1B, may be protruded further outwards than the end portion (the second end portion E2) of the battery can.

However, the cap plate 40 does not necessarily act as a passage of electric current. In other words, the cap plate 40 may be made of an electrically non-conductive material. Accordingly, the application of the above-described sealing gasket G1 is not necessary in the case where the battery can 20 and the cap plate 40 can be firmly secured and sealability of the open portion of the battery can 20 can be ensured through welding or by the application of another component.

Meanwhile, the battery 1 according to the present disclosure may further include the current collector plate 30, P, according to need. Specifically, the battery 1 may include a first current collector plate 30 between the first end portion E1 of the battery can 20 and the electrode assembly 10 and/or a second current collector plate P between the second end portion E2 of the battery can 20 and the electrode assembly 10. As shown in FIG. 1A, the current collector plate (the first current collector plate 30) may directly electrically contact the battery can 30, and as shown in FIG. 1B, the current collector plate (the second current collector plate P) may be connected to the lead 45. The lead 45 may be extended upward from the electrode assembly 10 and coupled to the connection plate 42c or directly coupled to the lower surface of the cap plate 40. The coupling of the lead 45 and other component may be done through welding. Preferably, the current collector plate (the second current collector plate P) may be integrally formed with the lead 45. In this case, the lead 45 may have a long plate shape extended outward from the central portion of the current collector plate (the second current collector plate P).

Figure 2:
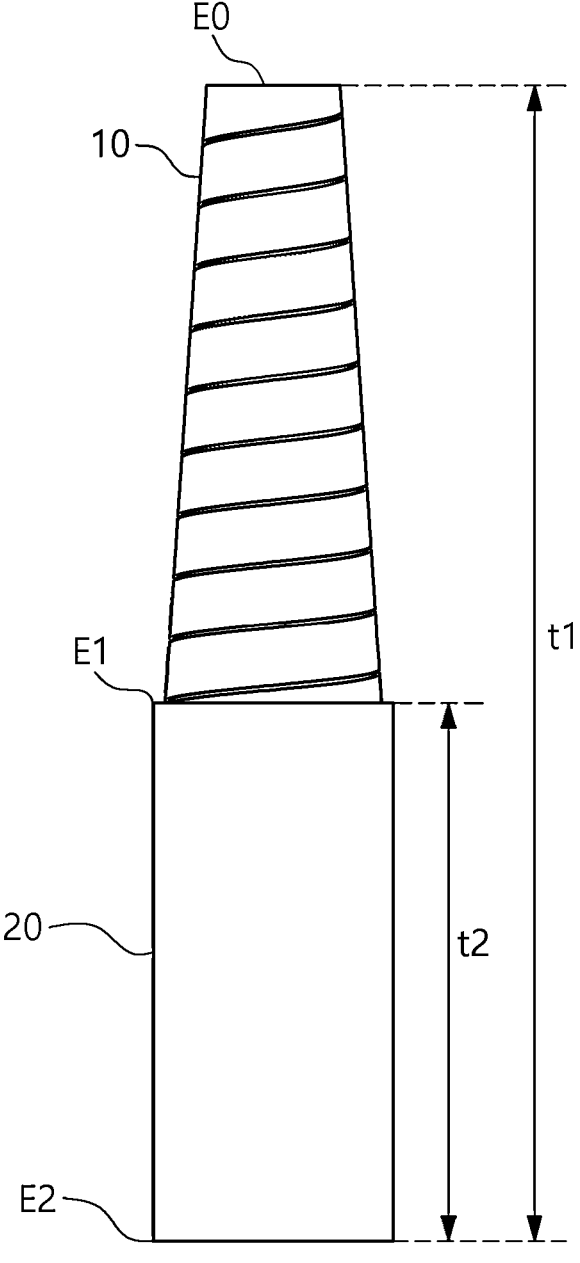
FIG. 2 shows a structure after an electrode assembly was ejected through a first end portion of a battery can according to an aspect of the present disclosure.

FIG. 2 shows the structure of the electrode assembly 10 after the electrode assembly 10 is ejected through the first end portion E1 of the battery can 20 by an increase in internal pressure within the battery can 20. A distance t1 is a distance from the end portion E0 of the electrode assembly 10 located farthest away from the battery can 20 to the second end portion E2 of the battery can 20. A distance t2 is a distance between the first end portion E1 and the second end portion E2 of the battery can 20. The distance t1 is 1.25 times or more, 1.27 times or more, 1.275 times or more, 1.3 times or more, 1.35 times or more, 1.4 times or more, 1.45 times or more, 1.5 times or more, 1.55 times or more, 1.6 times or more, 1.65 times or more, or 1.7 times or more than the distance t2. The distance t1 may be 3 times or less, 2.9 times or less, 2.8 times or less, 2.7 times or less, 2.6 times or less, or 2.5 times or less than the distance t2. For example, the distance t1 may be from 1.25 to 3 times the distance t2, or any other range formed from a combination of the endpoints listed above.

The increase in internal pressure of the battery can may occur due to one or more of overcharge, defects in at least one of the elements of the battery, abnormal chemical reaction, abnormal physical deformation, internal or external impacts of the battery, abnormal temperature increase, and so on. These factors are not always the cause of the increase in internal pressure of the battery can, but may increase the likelihood.

The range of ratios of the distance t1 to the distance t2 represents that the electrode assembly 10 was ejected with a strong force through the first end portion of the battery can 20. Accordingly, when the electrode assembly 10 is ejected, only the first end portion E1 of the battery can 20 or the cap plate 40 coupled to the first end portion E1 gets damaged, and any part other than the first end portion E1 or the cap plate 40 coupled to the first end portion E1, for example the side portion of the battery can, is less likely to get damaged. Accordingly, it may be possible to reduce or prevent the risk of fire spreading through batteries in a battery pack including batteries according to the present disclosure.

By the above-described mechanism of action, in the lithium secondary battery according to an aspect of the present disclosure, the electrode assembly may be ejected through the first end portion of the battery can without or before thermal runaway of the battery can, or without or before side rupture of the battery can.

As described herein, the thermal runaway of the battery can refers to a phenomenon in which fire occurs due to internal and/or external thermal factors of the battery, or temperature rise by chemical or physical impacts. The side rupture of the battery can refers to the release of the pressure in the battery can through the side of the battery can due to tearing or melting or the formation of pin holes in the battery can at a part of the battery can other than the first end portion and the second end portion of the battery can, i.e. the part connecting the first end portion to the second end portion. It may be understood that the crimping portion and the beading portion are also included in the side of the battery can.

In the lithium secondary battery according to an aspect of the present disclosure, when the pressure in the battery can increases, at least a portion of the electrode assembly is ejected with the strong force through the first end portion of the battery can, so the part of the battery can other than the first end portion, i.e., the side of the battery can, is not destroyed. Additionally, in the lithium secondary battery according to an aspect of the present disclosure, because the electrode assembly is ejected out of the battery can in a very short time by the strong pressure, thermal runaway does not occur in the battery can before a predetermined part or more of the electrode assembly slips out of the battery can.

For example, the electrode assembly may be ejected through the first end portion of the battery can by the increase in internal pressure of the battery can in the overcharge condition by the repeated charge and discharge of the lithium secondary battery at the rate of from 1.5 C to 2 C, for example, at the rate of 1.7 C.

Figure 3:
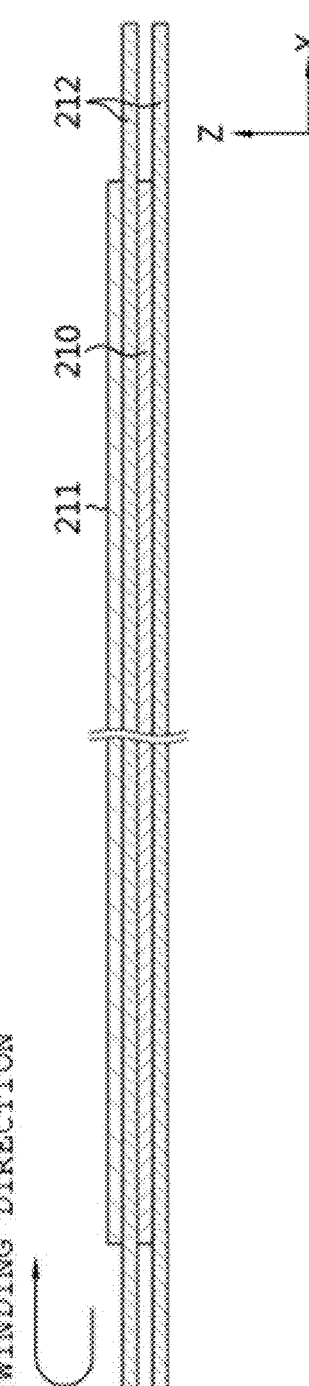
FIG. 3 is a diagram showing the electrode assembly before winding according to an aspect of the present disclosure.
Figure 4:
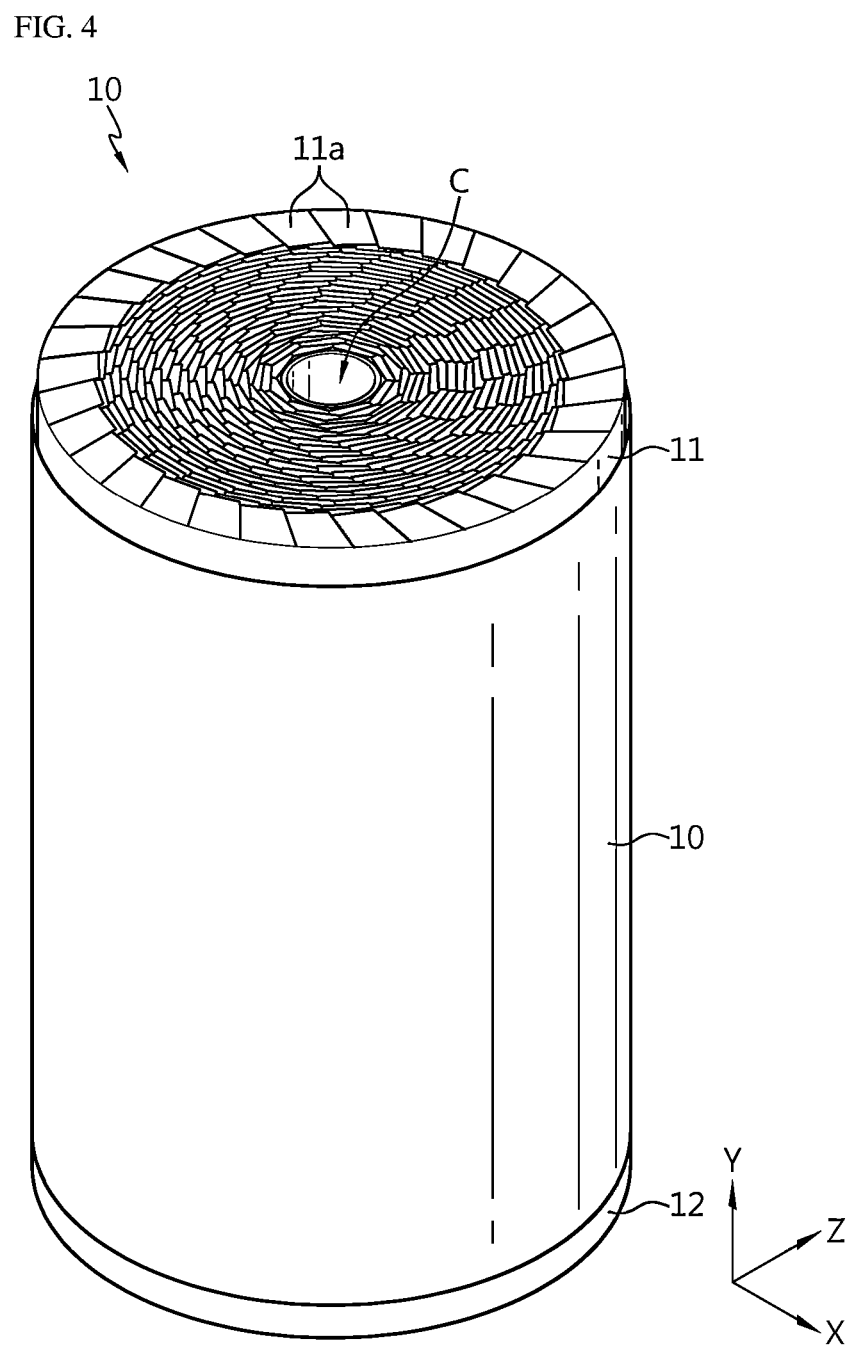

According to an example, the electrode assembly is a jellyroll-type electrode assembly including the positive electrode plate and the negative electrode plate wound in a direction with a separator interposed between the positive electrode plate and the negative electrode plate. FIG. 3 is a diagram showing the electrode assembly 10 before winding, and FIG. 4 is a diagram showing the electrode assembly 10 after winding.

As shown in FIG. 3, the electrode assembly 10 may have a structure in which the separator 212, the positive electrode plate 210, the separator 212, and the negative electrode plate 211 are stacked in a sequential order at least one time. This stack is wound in the x direction to form a jellyroll-type electrode assembly. When the jellyroll-type electrode assembly 10 is ejected through the first end portion E1 of the battery can 20, a part of the electrode assembly close to the winding center C may be ejected farther away from the battery can 20, into a spiral structure as shown in FIG. 2.

Referring again to FIGS. 1A and 1B, the first end portion E1 of the battery can 20 or the cap plate 40 disposed at the first end portion E1 include vent portions 41, 201.

FIG. 1A shows the structure in which the cap plate 40 disposed at the first end portion E1 of the battery can 20 has the vent portion 41. The cap plate 40 may be secured to the first end portion E1 of the battery can 20, and the cap plate 40 may include the vent portion 41. In this aspect, the electrode assembly 10 may be ejected through the first end portion E1 of the battery can 20 through destruction of the structure for securing the cap plate 40 to the first end portion E1 of the battery can 20 or fracture of the vent portion 41.

FIG. 1B shows the structure in which the vent portion 201 is present at the first end portion E1 of the battery can 20. The battery of FIG. 1B has the opening portion at the second end portion E2 of the battery can, and the cap plate 40 is disposed at the second end portion E2. In this instance, the electrode assembly 10 may be ejected through the first end portion E1 of the battery can 20 through fracture of the vent portion 201.

The vent portions 41, 201 correspond to an area that is formed at a part of the cap plate 40 or the battery can 20 and is structurally weaker than the surrounding area to be easily ruptured when the internal pressure is applied. The vent portions 41, 201 may be, for example, an area having a smaller thickness than the surrounding area. To realize the smaller thickness, the vent portions 41, 201 may include a notch.

According to an aspect, the internal pressure at which the vent portion is ruptured may be 21 kgf/cm² or more, 21.5 kgf/cm² or more, 22 kgf/cm² or more, 22.5 kgf/cm² or more, 23 kgf/cm² or more, 23.5 kgf/cm² or more, 24 kgf/cm² or more, 24.5 kgf/cm² or more, 25 kgf/cm² or more, more than 25 kgf/cm², 25.5 kgf/cm² or more, 26 kgf/cm² or more, 26.5 kgf/cm² or more, or 27 kgf/cm² or more. According to an aspect, the internal pressure at which the vent portion is ruptured may be less than or equal to the pressure at which the cap plate is separated from the battery can. For example, when the battery can includes the means for securing the cap plate, for example, the crimping portion, the internal pressure at which the vent portion is ruptured may be less than or equal to the pressure at which the crimping portion is uncrimped. As another example, when the cap plate is joined to the battery can by welding, the internal pressure at which the vent portion is ruptured may be less than or equal to the pressure at which the cap plate is separated from the battery can due to damage to the joined part at the weld. The internal pressure at which the vent portion is ruptured may be 29 kgf/cm² or less, 28.5 kgf/cm² or less, 28 kgf/cm² or less, 27.5 kgf/cm² or less, or 27 kgf/cm² or less. According to an aspect, the internal pressure at which the vent portion is ruptured may be 21 kgf/cm² or more and 29 kgf/cm² or less, 24 kgf/cm² or more and 29 kgf/cm² or less, more than 25 kgf/cm² and 29 kgf/cm² or less, or any range formed by a combination of the previously described endpoints. When the internal pressure at which the vent portion is ruptured is outside the range described above, the electrode assembly may not be ejected out of the battery can. Alternatively, if the electrode assembly is ejected, the electrode assembly may not be ejected through only the first end portion of the battery can, causing rupture of the side portion of the battery can. Accordingly, when the internal pressure at which the vent portion is ruptured is within the range described above, it may be possible to improve the safety of the battery and the battery can by having at least a portion of the electrode assembly be ejected through the first end portion of the battery can without ruptures in the side portion of the battery can. The internal pressure at which the vent portion is ruptured may be depend, at least in part, on the shape, size, material, or thickness of the vent portion, a thickness difference between the vent portion and the surrounding area, and so on.

Figure 5:
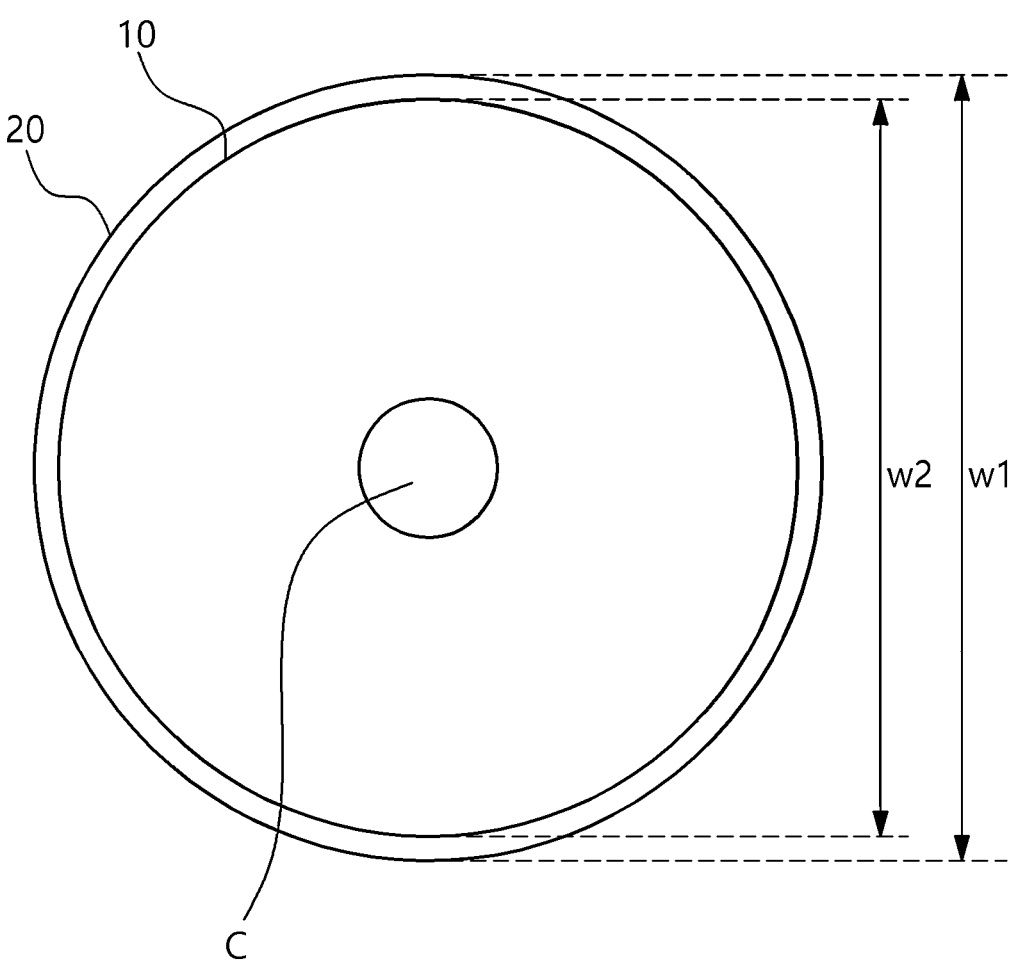
FIG. 5 shows a cross section of the electrode assembly in a direction perpendicular to a winding axis according to an aspect of the present disclosure.

Referring now to FIG. 5, according to an aspect, a ratio of the maximum width w2 in the cross section of the electrode assembly 10 in the direction perpendicular to the winding axis to the maximum width w1 in the cross section of the battery can 20 in the direction perpendicular to the winding axis may be less than 1. When the lithium secondary battery is cylindrical in shape, the maximum width w1 or w2 in the cross section of the battery can 20 or the electrode assembly 10 respectively in the direction perpendicular to the winding axis may be the diameter of the battery can 20 or the electrode assembly 10 passing through the winding axis (the winding center C). FIG. 5 shows the cross section of the electrode assembly 10 in the direction perpendicular to the winding axis, and the ratio of the maximum width w2 of the electrode assembly 10 to the maximum width w1 of the battery can 20 may be less than 1. For example, the ratio of w2 to w1 may be 0.995 or less, 0.99 or less, 0.985 or less, or 0.98 or less. According to an aspect, after injection of an electrolyte solution into the battery can and before the electrode assembly is ejected, such that the electrode assembly is filled with the electrolyte solution, the ratio of the maximum width in the cross section of the electrode assembly in the direction perpendicular to the winding axis to the maximum width in the cross section of the battery can in the direction perpendicular to the winding axis may be less than 1. According to an aspect, before injection of the electrolyte solution into the battery can, the ratio of the maximum width in the cross section of the electrode assembly in the direction perpendicular to the winding axis to the maximum width in the cross section of the battery can in the direction perpendicular to the winding axis may be less than 1. As the maximum width in the cross section of the electrode assembly in the direction perpendicular to the winding axis is smaller, the force by which the electrode assembly is ejected through the first end portion of the battery can may be greater.

Figure 6:
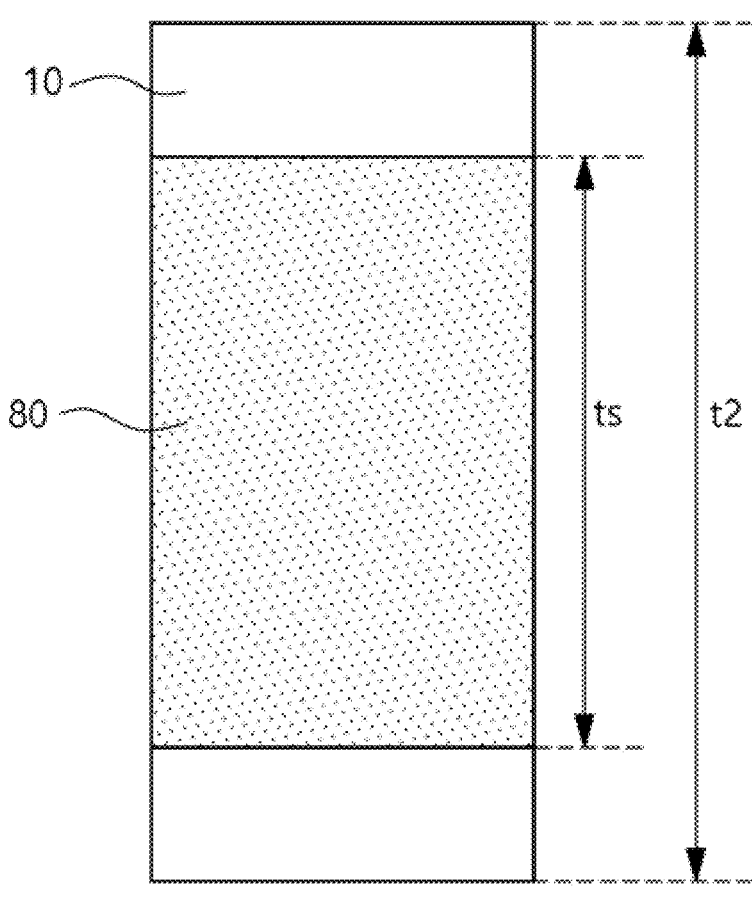
FIG. 6 shows a sealing tape attached to the outer surface of the electrode assembly according to an aspect of the present disclosure.

According to an aspect of the present disclosure, a sealing tape including polypropylene or polyimide may be attached to the outermost end portion of the electrode assembly. In some aspects of the present disclosure, the sealing tape may comprise polypropylene. Referring now to FIG. 6, the sealing tape 80 is attached to the outer surface of the electrode assembly 10. When the electrode assembly 10 is a jellyroll type, the sealing tape 80 may play a role in securing the outermost end portion of the electrode assembly 10. The sealing tape 80 is attached to cover at least part of the side of the electrode assembly including the outermost end portion of the electrode assembly 10.

The surface of the sealing tape 80 that contacts the battery can may be made of a material that does not react with the electrolyte solution solvent and can maintain its original shape after exposure to the electrolyte solution solvent. For example, the surface of the sealing tape 80 that contacts the battery can may be made of polypropylene or polyimide. Because the polypropylene or polyimide does not react with the solvent of electrolyte solution it can maintain the original shape, as described above. Use of such a sealing tape 80 may cause the electrode assembly 10 to be ejected with a strong force through the first end portion E1 of the battery can. This may be due at least in part to the relatively smooth surface of the polypropylene or polyimide material. According to one or more aspects, the sealing tape 80 includes a substrate and an adhesive layer. The substrate is made of polypropylene or polyimide. The adhesive layer is attached to the side of the electrode assembly including the outermost end portion of the electrode assembly 10. Here, the adhesive layer is not limited to a particular type, and may include any known type in the art. For example, the adhesive layer may be made of any material that does not cause chemical reaction to the battery, and may include, for example and without limitation, an acrylic adhesive, or an SBR-based adhesive.

The sealing tape 80 may have a width ts that is 0.1 times or more, 0.2 times or more, 0.3 times or more, 0.4 times or more, 0.5 times or more, 0.6 times or more, 0.7 times or more, or 0.8 times or more than the distance t2 between the two end portions of the electrode assembly 10 or the length of the battery can (the distance between the first end portion E1 and the second end portion E2) in the axial direction Y of the winding axis of the electrode assembly 10. Additionally, the sealing tape 80 may have the width ts that is 0.95 times or less, 0.9 times or less, 0.8 times or less, 0.7 times or less, 0.6 times or less, or 0.5 times or less than the distance t2 between the two end portions of the electrode assembly 10 or the length of the battery can (the distance between the first end portion E1 and the second end portion E2) in the axial direction Y of the winding axis of the electrode assembly 10. The sealing tape 80 may have a length that is 0.1 times or more, 0.2 times or more, 0.3 times or more, 0.4 times or more, 0.45 times or more, 0.5 times or more, 0.6 times or more, 0.7 times or more, 0.8 times or more, 0.9 times or more, or 0.95 times or more than the outermost circumference of the electrode assembly 10 in the circumferential direction X of the electrode assembly 10. The sealing tape 80 may have the length that is 1 time or less, or 0.98 times or less than the outermost circumference of the electrode assembly 10 in the circumferential direction X of the electrode assembly 10. Because the sealing tape having the above-described width and length is made of polypropylene or polyimide on the surface that contacts the battery can, it may cause the electrode assembly 10 to be ejected with the strong force through the first end portion E1 of the battery can. For example, when the lithium secondary battery is a 4680 cell, the width fs of the sealing tape 80 may range from 30 mm to 65 mm, and the length in the circumferential direction X of the electrode assembly 10 may range from 130 mm to 135 mm.

According to an aspect, as shown in FIGS. 1A and 1B, the first current collector plate 30 is included between the first end portion E1 of the battery can 20 and the electrode assembly 10.

Figure 7:
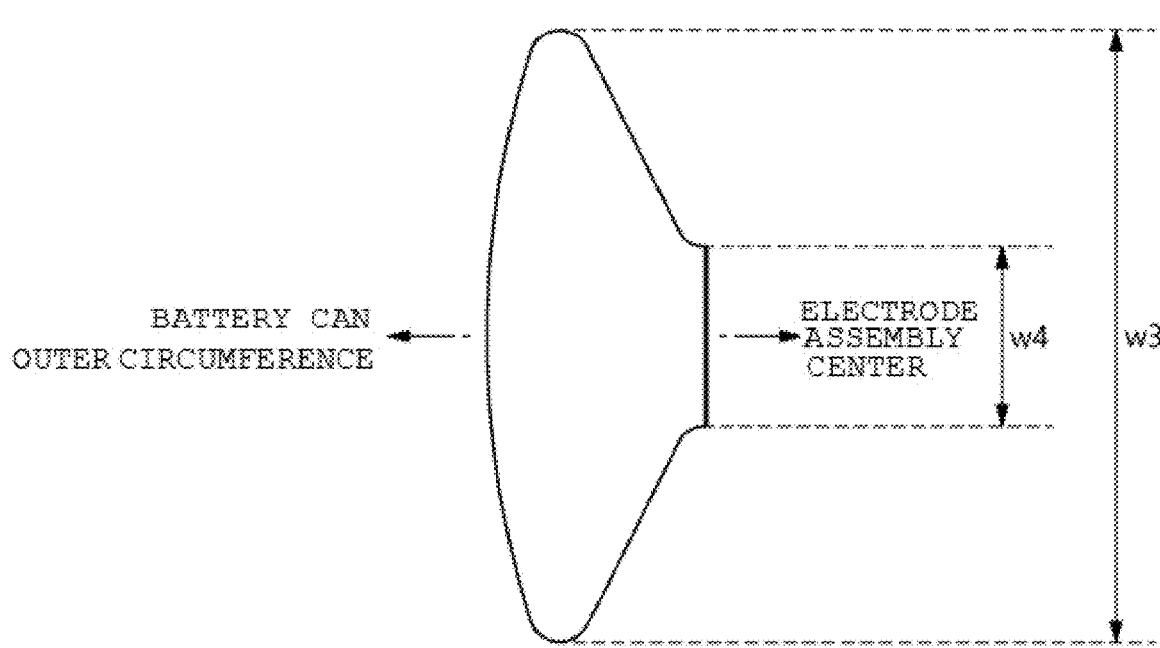
FIG. 7 shows a tapered structure of a battery can coupling portion of a first current collector plate according to an aspect of the present disclosure.

The first current collector plate may have a battery can coupling portion having a tapered structure. The tapered structure may be a part that is welded to the battery can. Using the first current collector plate comprising a battery can coupling portion having the tapered structure may allow the first current collector plate to easily break when the electrode assembly 10 passes through the first end portion E1 of the battery can 20. This may minimize the effect of the first current collector plate on the ejection of the electrode assembly 10. FIG. 7 shows the battery can coupling portion having the tapered structure in the first current collector plate. The tapered structure may have a minimum width w4 closer to the center of the battery can or the electrode assembly. The tapered structure may have a maximum width w3 in a direction perpendicular to the diameter passing through the center axis of the battery can and the electrode assembly. A ratio of w4 to w3 may be 0.7 or less, 0.6 or less, 0.5 or less, 0.45 or less, 0.4 or less, or 0.3 or less. The minimum width w4 of the tapered structure close to the center of the battery can and the electrode assembly may be equal to the width of a connection portion 33b described in greater detail below.

According to an aspect, as shown in FIG. 1A, the first current collector plate 30 includes a support portion 31 located on one surface of the electrode assembly 10 and the plurality of battery can coupling portions 33 extended from the support portion 31 and coupled to the inner surface of the battery can 20. At least one of the support portion 31 or the battery can coupling portions 33 may be electrically connected to the electrode assembly 10. For example, a tab (an uncoated portion) of the electrode assembly may be coupled to at least one of the support portion 31 or the battery can coupling portion 33 of the first current collector plate 30.

Figure 8:
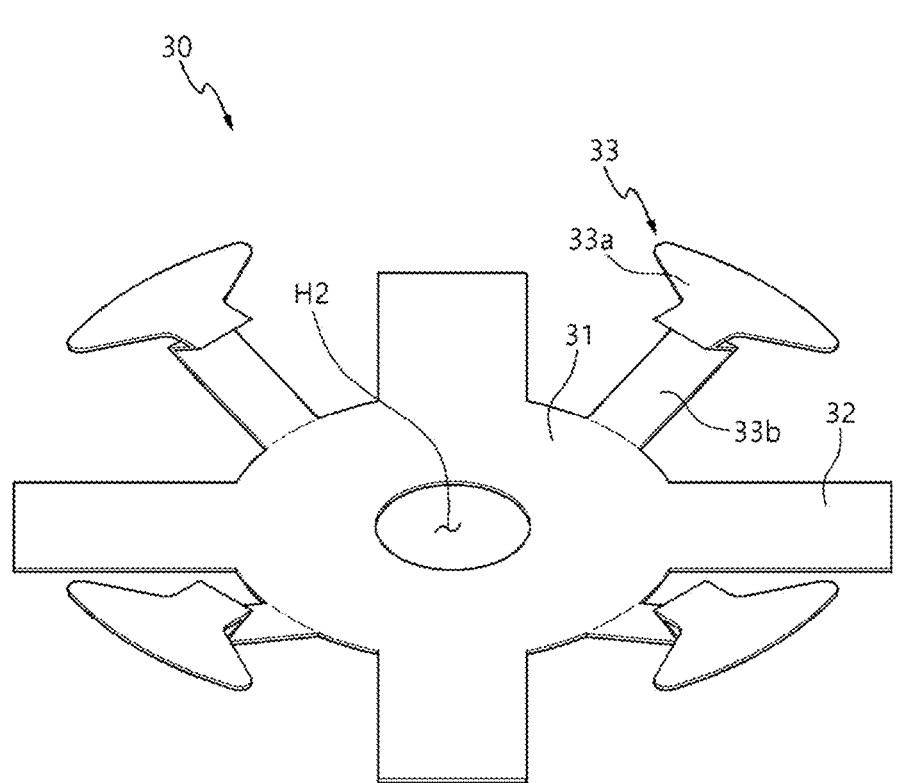
FIG. 8 shows the structure of the first current collector plate according to an aspect of the present disclosure.

Referring now to FIG. 4, according to a further aspect, the electrode assembly 10 may include the uncoated portion 11 that acts as the tab because an active material layer is not formed at the area of contact with the first current collector plate 30. Referring again to FIG. 1A, the first current collector plate 30 may further include a tab coupling portion 32 coupled to the uncoated portion. As shown in FIG. 8, the tab coupling portion 32 and the battery can coupling portion 33 may have a structure in which they are indirectly connected through the support portion 31, and are not directly connected to each other. That is, because each of the tab coupling portion 32 and the battery can coupling portion 33 is extended from the support portion 31, they are not directly connected to each other, but are electrically connected through the support portion 31. With the above-described structure, when an external impact is applied to the battery 1, it may be possible to minimize the likelihood of damage to the coupled part of the current collector plate 30 and the electrode assembly 10 and the coupled part of the current collector plate 30 and the battery can 20.

The tab coupling portion 32 and/or the battery can coupling portion 33 may be one tab coupling portion 32 and/or one battery can coupling portion 33, respectively, but may include a plurality of tab coupling portions 32 and/or a plurality of battery can coupling portions 33. The at least one tab coupling portion 32 and the at least one battery can coupling portion 33 may be arranged radially or approximately in an cross shape, or a combination thereof, relative to the central portion of the first current collector plate 30. In another aspect, each of the plurality of battery can coupling portions 33 may be disposed between the adjacent tab coupling portions 32.

Referring again to FIG. 1A, the support portion 31 and the plurality of tab coupling portions 32 are disposed on the electrode assembly 10. The tab coupling portion 32 is coupled to the uncoated portion 11 of the electrode assembly 10. The tab coupling portion 32 may be coupled to the uncoated portion 11 by welding along the radial direction of the electrode assembly 10. For example, the tab coupling portion 32 may be weld-coupled to the uncoated portion 11 in parallel to the first or second end portion of the battery can 20.

Meanwhile, not only the tab coupling portion 32 but also the support portion 31 may be coupled to the uncoated portion 11. The tab coupling portion 32 and the uncoated portion 11 may be coupled by welding. In the case of the battery can 20 having the beading portion 21, the support portion 31 and the tab coupling portion 32 are located at the lower position than the beading portion 21 (inside of the battery can).

Referring again to FIG. 1A and FIG. 8, according to an aspect, the support portion 31 may have a current collector plate hole H2 at a location corresponding to a winding hole H1 formed at the approximately central portion of the electrode assembly 10. The winding hole H1 and the current collector plate hole H2 may be in communication with each other and may act as a passage for insertion of a welding rod or irradiation of a laser beam for welding between the terminal 50 and/or the second current collector plate P or welding between the terminal 50 and the lead tab (not shown). Here, the second current collector plate P may be disposed between the second end portion E2 of the battery can 20 and the electrode assembly 10.

The current collector plate hole H2 may have a diameter that is substantially equal to or larger than the winding hole H1 of the electrode assembly 10 such that the current collector plate 30 does not cover the winding hole H1 formed at the core of the electrode assembly 10. In this case, because the winding hole H1 of the electrode assembly is not covered with the current collector plate 30, it may be possible to prevent the decrease in injection performance, and allow for the insertion of the device for welding or a sufficient space for laser irradiation. Additionally, when the electrode assembly is ejected through the first end portion of the battery can by the increased internal pressure in the battery can, the upper surface of the separator and the electrode plate located at or near the winding center of the electrode assembly 10 (adjacent to the first end portion of the battery can) may slip out through the first end portion by the strong pressure of the gas released through the first end portion at the winding center C of the electrode assembly 10.

Referring still to FIG. 1A and FIG. 8, the plurality of tab coupling portions 32 may be extended toward the sidewall of the battery can 20 approximately radially from the support portion 31 of the first current collector plate 30. Each of the plurality of tab coupling portions 32 may be located apart from each other along the circumference of the support portion 31. Meanwhile, to increase the coupling strength and reduce the electrical resistance through the increased coupling area between the first current collector plate 30 and the electrode assembly 10, not only the tab coupling portion 32 but also the support portion 31 may be coupled to the uncoated portion 11.

Referring now to FIGS. 1A, 4, and 8, at least part of the uncoated portion 11 may be formed in bent shape such that the end portion is approximately parallel to the tab coupling portion 32. In this case, the bending may be, for example, made toward the winding center C of the electrode assembly 10. When the end portion of the uncoated portion 11 is formed and coupled to the tab coupling portion 32 in parallel to the tab coupling portion 32, it may be possible to increase the coupling area, thereby improving the coupling strength and reducing the electrical resistance. It may also be possible to minimize the height of the electrode assembly 10, thereby improving the energy density. Meanwhile, the bent end portion 11*a* of the uncoated portion 11 may be overlapped in multiple layers. When the uncoated portion 11 is overlapped in multiple layers, the tab coupling portion 32 of the first current collector plate 30 may be coupled to a coupling surface formed by bending the uncoated portion 11 to form the multiple overlapping layers.

Referring again to FIG. 1A and FIG. 8, the plurality of battery can coupling portions 33 may extend toward the sidewall of the battery can 20 approximately radially from the support portion 31 of the first current collector plate 30. Each of the plurality of battery can coupling portions 33 may be located apart from each other along the circumference of the support portion 31. The at least one battery can coupling portion 33 may be located between the adjacent tab coupling portions 32. The plurality of battery can coupling portions 33 may be coupled to the inner surface of the battery can 20. For example, the battery can coupling portion 33 may be coupled to the beading portion 21. In one or more aspects, the battery can coupling portions 33 may be coupled to the upper surface of the beading portion 21. In the battery 1 of the present disclosure, when this structure is applied, the battery can coupling portion 33 may be naturally mounted on the beading portion 21 through the process of accommodating the electrode assembly 10 coupled with the first current collector plate 30 in the battery can 20. Accordingly, the welding process of the battery can 20 and the first current collector plate 30 may be easily performed. The welding for coupling of the battery can 20 and the first current collector plate 30 may include, for example, laser welding, resistance welding, ultrasonic welding, soldering, or spot welding. The battery can coupling portion 33 may be weld-coupled to the beading portion 21 to form multiple current paths to limit the resistance level below approximately 4 milliohms that is suitable for fast charging.

The battery can coupling portion 33 includes a coupling portion 33*a* coupled to the beading portion 21 on the inner surface of the battery can 20 and the connection portion 33*b* connecting the support portion 31 to the coupling portion 33*a*.

The coupling portion 33*a* is coupled to the inner surface of the battery can 20. When the battery can 20 has the beading portion 21, the coupling portion 33*a* may be coupled to the beading portion 21 as described above. The coupling portion 33*a* may have a shape that conforms to the shape of the upper surface of the beading portion 21. According to an aspect, for stable contact and coupling, both the beading portion 21 and the coupling portion 33*a* may be extended along a direction approximately parallel to the lower surface of the battery can 20, i.e., a direction approximately perpendicular to the sidewall of the battery can 20. The coupling portion 33*a* may have a flat surface which is coupled to the upper surface of the beading portion 21 facing the open portion. That is, the coupling portion 33*a* includes the flat portion approximately parallel to the lower surface of the battery can 20. When the battery can coupling portion 33 stably contacts the beading portion 21, welding between the two components may be done well, thereby improving the coupling strength between the two components and minimizing the resistance increase at the coupled part.

The connection portion 33b may be extended in the radial direction and the winding axial direction. The connection portion 33b may have an upwardly convex structure (toward the first end portion E1 of the battery can 20), and may include at least one bending portion. For example, the boundary of the coupling portion 33a and the connection portion 33b may be bent at an obtuse angle. The slope of the connection portion 33b may decrease stepwise or gradually as it goes toward the beading portion.

As shown in FIG. 8, the connection portion 33b may have at least one bending portion where the extension direction changes at least one time between the support portion 31 and the coupling portion 33a. That is, the connection portion 33b may have, for example, a spring-like structure or a bellows-like structure that can be contracted and stretched within a predetermined range. Meanwhile, the connection portion 33b may be elastically biased upward by the bending portion. This structure of the connection portion 33b may bring the coupling portion 33a into close contact with the beading portion 21 in the process of accommodating the electrode assembly 10 coupled with the first current collector plate 30 in the battery can 20 even in the presence of height dispersion of the electrode assembly 10 within a predetermined range. Additionally, by this structure of the connection portion 33b, it may be possible to achieve more stable shaping in the sizing process.

Referring again to FIG. 1A and FIG. 8, the coupling portion 33a may be weld-coupled to the upper surface of the beading portion 21 (the upper surface of the upper beading portion). Moreover, the coupling portion 33a may be weld-coupled to the flat area on the upper surface of the beading portion 21. The weld area between the coupling portion 33a and the beading portion 21 may be narrower than the flat upper surface of the beading portion 21. When the connection portion 33b has the bending portion, the angle between the coupling portion 33a and the connection portion 33b may be acute due to the bending portion.

Figure 11:
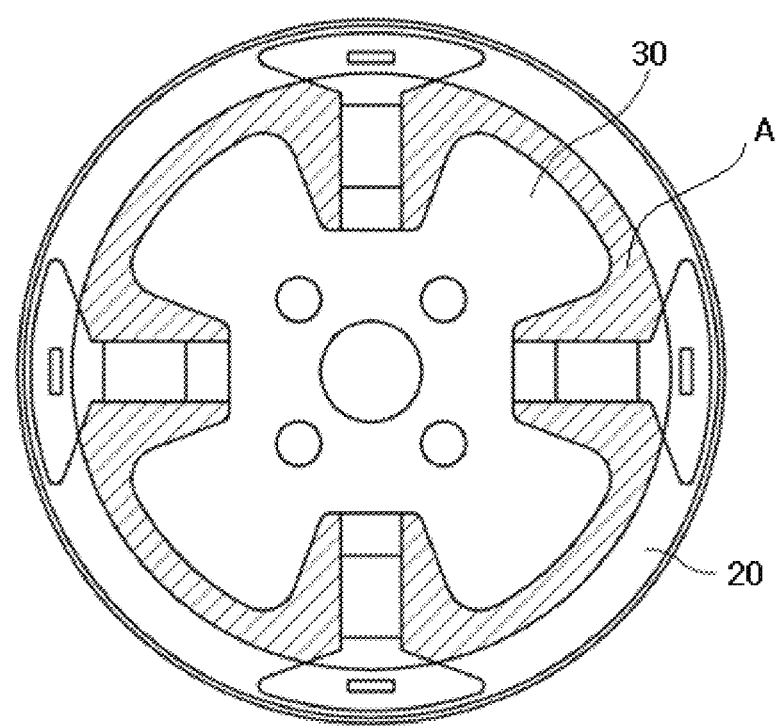
FIG. 11 is a diagram showing a flame release area at the first end portion of the battery can.

According to an aspect, when the first current collector plate is projected onto the open area of the first end portion of the battery can, the area of the projected part of the first current collector plate may range between 50% and 70%, based on the total open area of the first end portion. The open area of the first end portion of the battery can does not include the side thickness of the battery can. Additionally, when the width of the battery can is reduced due to the presence of the crimping portion 22 or the beading portion 21 at the first end portion side of the battery can, the open area of the first end portion refers to the open area having the minimum width. The projection of the first current collector plate refers to projection of the first current collector plate onto the open area in a direction parallel to the side of the battery can. The aforementioned area range may correspond to a flame release area, where the electrode assembly directly faces the opening portion of the first end portion of the battery can without the first current collector plate interposed therebetween. The flame release area may be approximately from 30% to 50% based on the total open area of the first end portion of the battery can. The flame release area may be an area excluding the projected area of the first current collector plate from the open area of the first end portion of the battery can, as shown in section A indicated by hatching in FIG. 11. The outer diameter of section A indicated by hatching in FIG. 11 is the outermost part of the open area of the first end portion of the battery can except the projected area of the crimping portion 22 or the beading portion 21 of the battery can. The flame release area is an area excluding the projected area of the first current collector plate from the entire area surrounded by the outer diameter of section A indicated by hatching in FIG. 11, i.e., the total open area. The flame release area range may play a role in reducing the resistance of the battery during the normal use of the battery, and making the first current collector plate easily break when the electrode assembly is ejected through the first end portion of the battery can. The flame release area range may be adjusted through the addition of a hole and/or a slit to the support portion 31, adjustment of the area of the support portion 31 and/or the tab coupling portion 32, or adjustment of the width of the connection portion 33b.

Figure 9:
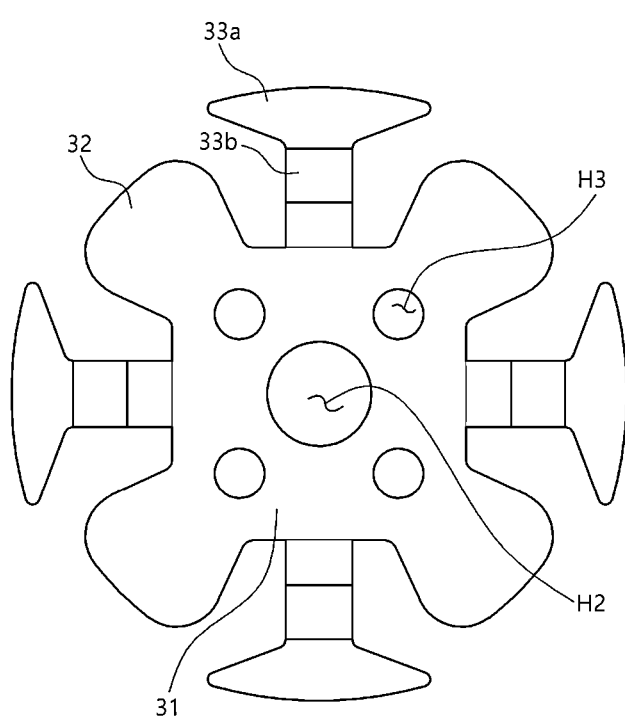
FIG. 9 shows the structure of the first current collector plate according to an aspect of the present disclosure.
Figure 10:
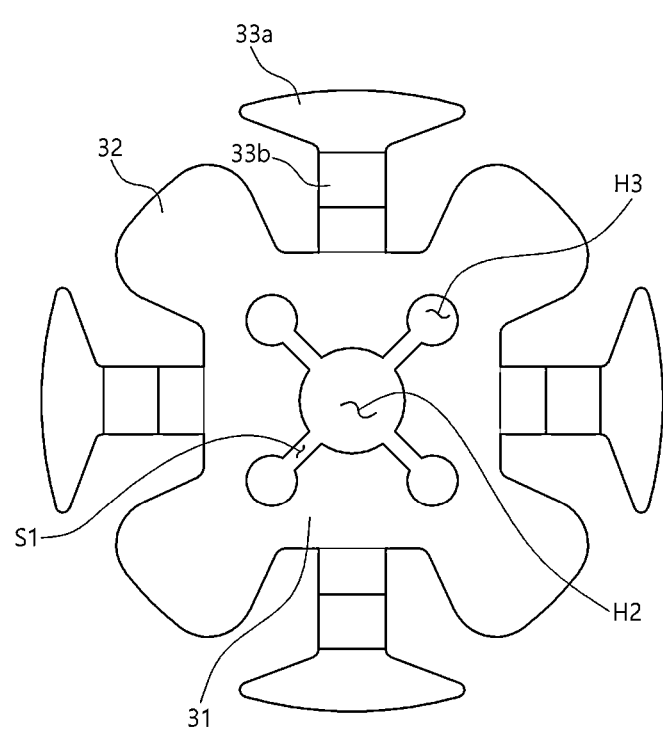
FIG. 10 shows the structure of the first current collector plate according to an aspect of the present disclosure.

Referring now to FIG. 9, according to an aspect, the support portion 31 may include at least one hole H3. The hole H3 may include one or two or more holes H3 on the circumference of the current collector plate hole H2. As shown in FIG. 10, the support portion 31 may further include a slit S1 extended from the hole H3 and the current collector plate hole H2. The size or area of the hole H3 and the slit S1 may be designed in view of the area of the first current collector plate or the reduction in electrical resistance. Additionally, the width of the connection portion 33b of the first current collector plate 30 may be adjusted to disconnect the connection portion 33b, making the first current collector plate 30 easily break when the electrode assembly is ejected through the first end portion of the battery can. For example, when the electrode assembly is ejected through the first end portion of the battery can, 50% or more, 70% or more, 75% or more of the plurality of connection portions 33b may be completely disconnected.

The size of the hole H3, the area (or the width) of the slit S1, and/or the width of the connection portion 33b of the first current collector plate 30 may be designed in such a range that the area of the projected part of the first current collector plate is between 50% and 708, based on the total open area of the first end portion, when the first current collector plate is projected onto the open area of the first end portion of the battery can. In other words, the size of the hole H3, the area (or the width) of the slit, and/or the width of the connection portion 33b of the first current collector plate 30 may be designed such that the flame release area is approximately between 30% and 50%, for example, between 34% and 36%, between 38% and 40%, or between 44% and 47%, based on the total open area of the first end portion of the battery can.

Figure 12:
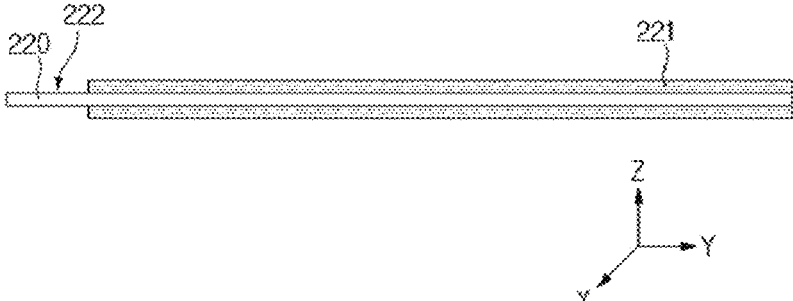
FIG. 12 is a diagram showing a cross-section of an electrode plate (a positive or negative electrode plate) according to an aspect of the present disclosure.

FIG. 12 is a diagram showing the cross-sectional structure of the electrode plate (the positive electrode plate or the negative electrode plate) according to an aspect of the present disclosure. Referring to FIG. 3 and FIG. 11, the positive electrode plate 210 and the negative electrode plate 211 may have a structure in which an active material layer 221 is formed on a sheet-shaped current collector 220. The sheet shaped current collector 220 may include an uncoated portion 222 where the active material layer 221 is not formed.

The use of the positive electrode plate 210 and the negative electrode plate 211 including the uncoated portion 222 may form a battery having a tab-less structure in which a separate electrode tab is absent. In such batteries having a tab-less structure at least part of the uncoated portion of the positive electrode plate 210 and the negative electrode plate 211 acts as an electrode tab. Specifically, the uncoated portion 222 may be formed at one end portion of the current collector 220 and extend along the winding direction X. A current collector plate may be coupled to each of the positive electrode plate uncoated portion and the negative electrode plate uncoated portion, and connected to each of the positive and negative electrode terminals to realize a battery having a tab-less structure. The reference numerals 11 and 12 in FIGS. 1A and 1B indicate the uncoated portion of the negative electrode plate 211 and the uncoated portion of the positive electrode plate 210, of FIG. 3 respectively.

The positive electrode plate uncoated portion and the negative electrode plate uncoated portion may be shaped into a plurality of independently bendable segments 11a, and at least part of the plurality of segments may be bent toward the winding center C of the electrode assembly as depicted in FIG. 4. The segments may be formed by processing the uncoated portion of the positive electrode plate and the negative electrode plate through a metal foil cutting process such as laser notching, ultrasonic cutting, or punching.

When the uncoated portion of the positive electrode plate and the negative electrode plate is shaped into the plurality of segments, it may be possible to reduce stress applied to the uncoated portion during bending. This may prevent deformation or destruction of the uncoated portion, and improve welding characteristics with the current collector plate.

The current collector plate and the uncoated portion may be joined by welding. To improve welding characteristics, a strong pressure may be applied to the weld area of the uncoated portion to make the uncoated portion as flat as possible. However, in the bending process, the uncoated portion may be irregularly distorted and deformed. The deformed part may contact the electrode of the opposite polarity, causing internal shorts or microcracks in the uncoated portion. However, when the uncoated portion of the positive electrode plate and the negative electrode plate is shaped into the plurality of independently bendable segments, it may be possible to mitigate stress applied to the uncoated portion during bending. This may minimize deformation and destruction of the uncoated portion.

Additionally, when the uncoated portion is shaped into the segments as described above, overlap may occur between the plurality of segments during bending. This may increase the welding strength with the current collector plate, and prevent ablation of the separator or the active material due to laser penetration into the electrode assembly when the advanced technology such as laser welding is used. According to one or more aspects of the present disclosure, at least part of the plurality of bent segments may be overlapped on the top and bottom of the electrode assembly, and the current collector plate may be coupled to the plurality of overlapped segments.

For example, the battery having a tab-less structure may be manufactured through the following method. First, the separator, the positive electrode plate, the separator, and the negative electrode plate are stacked in a sequential order such that the uncoated portion 222 of each of the positive electrode plate 210 and the negative electrode plate 211 is disposed in opposite directions. The stack is wound in a winding direction to manufacture the electrode assembly. Subsequently, as shown in FIG. 4, the positive electrode plate uncoated portion 12 and the negative electrode plate uncoated portion 11 may be bent toward the winding center C. The current collector plate may be coupled to each of the positive electrode plate uncoated portion 12 and the negative electrode plate uncoated portion 11 by welding, and the current collector plate may be connected to the electrode terminal to manufacture the battery having a tab-less structure.

The current collector plate includes the first current collector plate 30 and the second current collector plate P as shown in FIG. 1A or 1B. Because the current collector plate has a larger cross-sectional area than the electrode tab, and resistance is inversely proportional to the cross-sectional area of the passage through which the electric current flows, when the lithium secondary battery is formed with the above-described structure, the battery resistance may be greatly reduced. The first current collector plate 30 and the second current collector plate P may be coupled to the negative electrode plate uncoated portion 11 and the positive electrode plate uncoated portion 12, respectively, or may be coupled to the positive electrode plate uncoated portion 12 and the negative electrode plate uncoated portion 11, respectively, and each is connected to the electrode terminal (i.e., the positive or negative terminal).

The current collector plate may be made of a conductive metal such as aluminum, copper, or nickel. The lead may be additionally connected to the first current collector plate and/or the second current collector plate as needed. The lead may play a role in electrically connecting the current collector plate to the cap plate and/or the electrode terminal. The coupling of the lead and the other component may be done through welding. For example, the current collector plate may be integrally formed with the lead. In this case, the lead may have a long plate shape extended outward from the central portion of the current collector plate.

The first current collector plate 30 is coupled between the electrode assembly 10 and the first end portion E1 of the battery can, and the second current collector plate P is coupled between the electrode assembly 10 and the second end portion E2 of the battery can. A surface of the current collector plate P may be coupled to the uncoated portion 11 of the negative electrode plate or the uncoated portion 12 of the positive electrode plate, and the opposite surface may be electrically coupled to of the inner bottom surface the battery can 20 or the cap plate. In this instance, the coupling may be done by laser welding, resistance welding, ultrasonic welding, or soldering.

The battery 1 according to the present disclosure may further include the insulator S. The insulator S of FIGS. 1A and 1B may cover at least a portion of the second current collector plate P to prevent the direct contact between the second current collector plate P and the inner peripheral surface of the battery can 20. The insulator S may be made of an insulating polymer resin such as, for example, polyethylene, polypropylene, polyimide, or polybutyleneterephthalate.

According to one or more aspects of the present disclosure, the battery can 20 may be a cylindrical container having the opening portion on top (the first end portion or the second end portion), and may be made of a conductive metal such as aluminum or steel. According to an aspect, the battery can 20 is electrically connected to the uncoated portion 11 of the negative electrode plate, and acts as the negative terminal to transfer the electric current from the external power source to the negative electrode plate when the battery can 20 contacts the external power source.

According to an aspect, the thickness of the side of the battery can 20 may range between 0.1 mm and 0.4 mm. For example, the thickness of the side of the battery can 20 may be between 0.13 mm and 0.32 mm. By improving safety of the battery according to the above-described aspects, it may be possible to ensure safety when the thickness of the battery can lies in the aforementioned range.

The lithium secondary battery according to the present disclosure may be a high-capacity secondary battery having a capacity of 25 Ah or more.

The lithium secondary battery according to the present disclosure may be a large battery having a ratio of form factor (defined as a value obtained by dividing the diameter of the cylindrical battery by its height, i.e., a diameter($\Phi$)-to-height(H) ratio) of 0.4 or more. Here, the form factor refers to a value relating the diameter (the maximum width) and height of the battery.

The battery according to the present disclosure may be, for example, a 46110 cell (diameter 46 mm, height 110 mm, form factor ratio 0.418), a 4875 cell (diameter 48 mm, height 75 mm, form factor ratio 0.640), a 48110 cell (diameter 48 mm, height 110 mm, form factor ratio 0.436), a 4880 cell (diameter 48 mm, height 80 mm, form factor ratio 0.600), a 4680 cell (diameter 46 mm, height 80 mm, form factor ratio 0.575), or a 4695 cell (diameter 46 mm, height 95 mm, form factor ratio 0.484). In the number indicating the form factor, the first two numbers indicate the diameter of the battery, and the next two or three numbers indicate the height of the battery.

According to the above-described aspects of the present disclosure, the large battery having the ratio of form factor of 0.4 or more may achieve high safety.

Meanwhile, the lithium secondary battery according to the present disclosure is a battery having a tab-less structure including no electrode tab.

The battery having a tab-less structure may have a structure in which each of the positive electrode plate and the negative electrode plate includes the uncoated portion where the active material layer is not formed. The positive electrode plate uncoated portion and the negative electrode plate uncoated portion are located at the top and bottom of the electrode assembly, respectively. Current collector plates are coupled to the positive electrode plate uncoated portion and the negative electrode plate uncoated portion, respectively, and the current collector plates are connected to the electrode terminals. FIGS. 1A and 1B are cross-sectional views of cylindrical batteries having a tab-less structure according to aspects of the present disclosure. However, the structure of the cylindrical battery of the present disclosure is not limited to the disclosed aspects in FIGS. 1A and 1B.

The positive electrode plate, the negative electrode plate, the separator and the electrolyte may include those well known or commonly used in the corresponding field without limitation.

For example, the positive electrode active material may include alkali metal compounds represented by the general chemical formula $A[A_xM_y]O_{2+z}$, where A includes at least one of Li, Na or K; M includes at least one of Ni, Co, Mn, Ca, Mg, Al, Ti, Si, Fe, Mo, V, Zr, Zn, Cu, Al, Mo, Sc, Zr, Ru, or Cr; $x \geq 0$, $1 \leq x+y \leq 2$, $0.1 \leq z \leq 2$; and the stoichiometric coefficients x, y and z are selected to keep the compound electrically neutral.

In another example, the positive electrode active material may include alkali metal compounds $xLiM^1O_2(1x)$ $Li_2M^2O_3$, where $M^1$ includes at least one element having the average oxidation state of 3; $M^2$ includes at least one element having the average oxidation state of 4; and $0 \leq x \leq 1$. Examples of such positive electrode active materials are disclosed in U.S. Pat. Nos. 6,677,082, 6,680,143.

In still another example, the positive electrode active material may include lithium metal phosphate represented by the general chemical formula $Li_aM^1_xFe_{1x}M^2_yP_{1y}M^3_zO_{4z}$, where $M^1$ includes at least one of Ti, Si, Mn, Co, Fe, V, Cr, Mo, Ni, Nd, Al, Mg or Al; $M^2$ includes at least one of Ti, Si, Mn, Co, Fe, V, Cr, Mo, Ni, Nd, Al, Mg, Al, As, Sb, Si, Ge, V or S; $M^3$ includes halogen group elements optionally including F; $0 < a \leq 2$, $0 \leq x \leq 1$, $0 \leq y < 1$, $0 \leq z < 1$; and the stoichiometric coefficients a, x, y and z are selected to keep the compound electrically neutral. Alternatively, the lithium metal phosphate represented by the general chemical formula $Li_3M_2(PO_4)_3$, where M includes at least one of Ti, Si, Mn, Fe, Co, V, Cr, Mo, Ni, Al, Mg or Al.

According to one or more aspects of the present disclosure, the positive electrode active material may include primary particles and/or secondary particles formed by agglomeration of the primary particles.

For example, the negative electrode active material may include carbon materials, lithium metal or lithium metal compounds, silicon or silicon compounds, or tin or tin compounds. The silicon compounds may include pure silicon, silicon oxide, silicon carbon composites, or silicon metal alloys. Metal oxides having a potential of less than 2 V, such as $TiO_2$ or $SnO_2$, may be also used as the negative electrode active material. The carbon materials may include low crystalline carbon, or high crystalline carbon.

The separator may include porous polymer films. For example, porous polymer films made of polyolefin-based polymer such as ethylene homopolymer, propylene homopolymer, ethylene/butene copolymer, ethylene/hexene copolymer, or ethylene/methacylate copolymer, may be used singly or in a stack. As another example, the separator may include commonly used porous nonwoven fabrics, for example, nonwoven fabrics made of high melting point glass fibers or polyethyleneterephthalate fibers.

The separator may include a coating layer of inorganic particles on at least one surface. Additionally, the separator itself may be a coating layer of inorganic particles. The particles that constitute the coating layer may have a structure in which the particles are held together with a binder such that interstitial volume exists between the adjacent particles.

The inorganic particles may include inorganic matter having the dielectric constant of 5 or more. Non-limiting examples of the inorganic particles may include at least one material selected from the group consisting of $Pb(Zr,Ti)O_3$ (PZT), $Pb_{1x}La_xZr_{1y}Ti_yO_3$ (PLZT), $PB(Mg_3Nb_{2/3})O_3PbTiO_3$ (PMNPT), $BaTiO_3$, hafnia ($HfO_2$), $SrTiO_3$, $TiO_2$, $Al_2O_3$, $ZrO_2$, $SnO_2$, $CeO_2$, MgO, Cao, Zno and $Y_2O_3$.

The electrolyte may be a salt having a structure $A^+B^-$. Here, $A^+$ includes an alkali metal cation such as $Li^+$, $Na^+$, $K^+$ or a combination thereof. Additionally, $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Additionally, the electrolyte may be dissolved in an organic solvent. The organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

Figure 13:
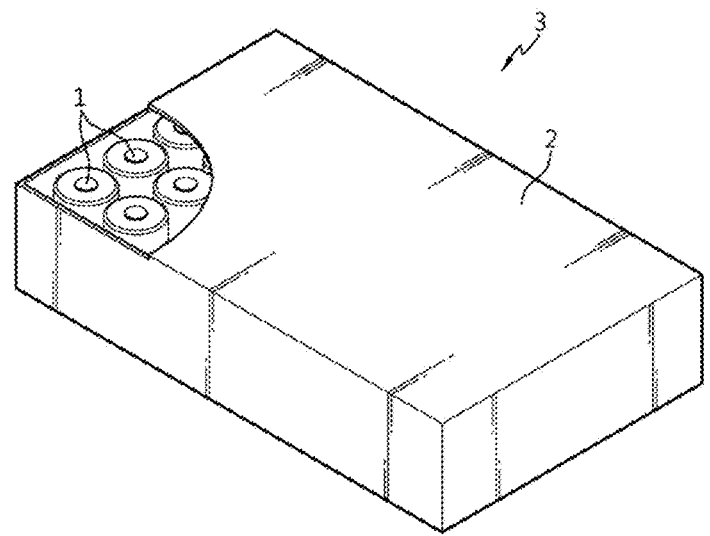
FIG. 13 is a schematic diagram of a battery pack including batteries according to an aspect of the present disclosure.

Referring to FIG. 13, a battery pack 3 includes a battery assembly in which a plurality of batteries 1 according aspects of the present disclosure are electrically connected to each other and a pack housing 2 accommodating the battery assembly. For convenience of illustration, some components such as a busbar for electrical connection, a cooling unit, or a power terminal are omitted from FIG. 13. Likewise, the electrical connection structure of the plurality of batteries 1 for the manufacture of the battery pack 3 is omitted.

Figure 14:
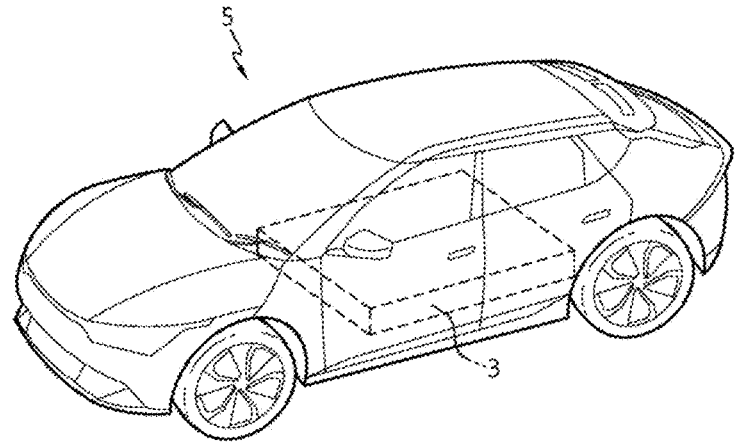
FIG. 14 is a schematic diagram of a vehicle including a battery pack according to an aspect of the present disclosure.

Referring to FIG. 14, a vehicle 5 according to an aspect of the present disclosure may include, for example, an electric vehicle, a hybrid electric vehicle or a plug-in hybrid electric vehicle. The vehicle 5 may include the battery pack 3 according to an aspect of the present disclosure. The vehicle 5 may be a four-wheeled vehicle or a two-wheeled vehicle. The vehicle 5 operates with the power supplied from the battery pack 3 according to an aspect of the present disclosure. The vehicle can mitigate the effects of climate change by reducing or eliminating greenhouse gas emissions.

The above-described aspects and drawings and the following examples are presented, but they are provided to describe the present disclosure by way of illustration, and the present disclosure is not limited thereto. It should be understood that a variety of changes and modifications may be made by persons having ordinary skill in the technical field pertaining to the present disclosure within the technical aspects of the present disclosure and the appended claims and their equivalents.

EXAMPLES

Example 1

A positive electrode plate and a negative electrode plate were stacked with a separator interposed between them in an order of the separator/the positive electrode plate/the separator/the negative electrode plate. The stack was wound together to manufacture a jellyroll-type electrode assembly. The positive electrode plate was obtained by coating a slurry on a current collector. The slurry included a solvent N-Methyl-2-pyrrolidone (NMP) in which a nickel, cobalt, manganese, aluminum (NCMA) active material, a carbon nanotube (CNT) conductive material, and a polyvinylidene fluoride (PDVF) binder were mixed at a weight ratio of 97.6:0.6:1.8. The negative electrode plate was obtained by coating a slurry on a current collector. The slurry included a solvent DI-Water in which an active material including graphite and silicon oxide, a CNT conductive material, and a carboxymethyl cellulose (CMC) binder were mixed at a weight ratio of 98.05:0.05:1.90. The separator was a ceramic coated polyethylene (PE). As shown in FIG. 4, an uncoated portion of each of the positive electrode plate and the negative electrode plate was configured to contact each of two end portions of the electrode assembly. The outer diameter of the manufactured electrode assembly was 44.5 mm, and the height, excluding a tab, was 72 mm (equal to the width of the separator).

A sealing tape having a 34 μm thick polyurethane substrate was attached to the outside of the electrode assembly over the area of 35 mm×134 mm.

As shown in FIG. 1A, the electrode assembly was inserted into a cylindrical battery can having a crimping portion and a beading portion and an opening portion at the first end portion. An electrolyte solution was injected into the battery can, and the opening portion of the battery can was sealed with a cap plate to manufacture a cylindrical lithium secondary battery. The cap plate included a vent portion configured to rupture at a pressure 15 kgf/cm² or more.

Figure 15:
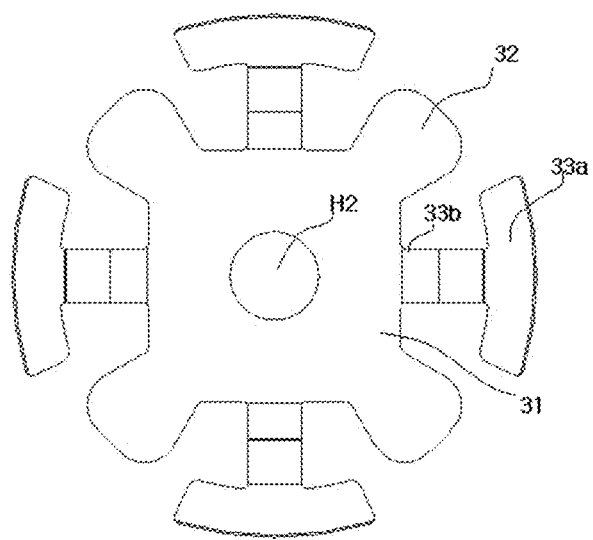
FIG. 15 shows the structure of a current collector plate used in Experimental Examples.

A battery can coupling portion of the first current collector plate was positioned between the cap plate and the electrode assembly. The first current collector plate had a thickness of 0.3 mm and the shape as shown in FIG. 15. A connection portion 33*b* of 6 mm in width was positioned at the beading portion of the battery can by welding. A flame release area A, as shown in FIG. 11, was 34.8% of the open area of the first end portion of the battery can. In the first current collector plate, a ratio of a minimum width w4 closer to the center of the battery can to a maximum width w3 perpendicular to the diameter of the battery can was 0.9.

The cylindrical battery can was a 4680 cell having the diameter of 46 mm, and the height of 80 mm (the form factor ratio 0.575).

An overcharge test was performed by repeatedly charging the as-prepared lithium secondary battery at 1.7 C from state of charge (SOC) 0% to SOC 100% and discharging. When the vent portion was ruptured, an evaluation was conducted to determine whether the electrode assembly was ejected through the first end portion of the battery can, the ejection distance, and whether or not the side rupture of the battery can occurred. The following TABLE 3 summarizes the results.

Example 2

Example 2 was carried out in the same way as Example 1 except that the sealing tape attached to the outside of the electrode assembly had a 30 μm thick polypropylene substrate and an area of 63 mm×134 mm.

Example 3

Figure 16:
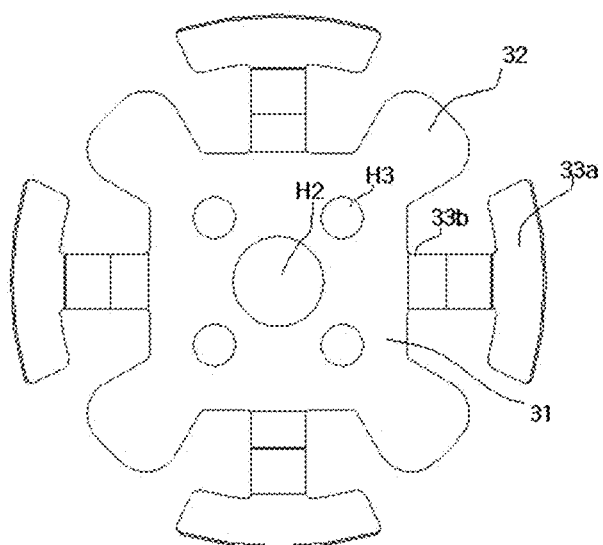
FIG. 16 shows the structure of a current collector plate used in Experimental Examples.

Example 3 was carried out in the same way as Example 1 except that a first current collector plate having the hole H3 as shown in FIG. 16 was used as the first current collector plate located between the cap plate and the electrode assembly. The flame release area A was 36.18, and the connection portion 33*b* was 6 mm in width.

Example 4

Example 4 was carried out in the same way as Example 1 except that a first current collector plate having the hole H3 as shown in FIG. 16 was used as the first current collector plate located between the cap plate and the electrode assembly. The flame release area A was 47.2%, and the connection portion 33*b* was 4 mm in width.

Example 5

Example 5 was carried out in the same way as Example 1 except that a first current collector plate having the hole H3 as shown in FIG. 9 was used as the first current collector plate located between the cap plate and the electrode assembly. The flame release area was 44.3%, and the connection portion 33*b* was 4 mm in width. The battery can coupling portion 33*a* had a tapered structure such that the minimum width was equal to the width of the connection portion 33*b*.

Example 6

Example 6 was carried out in the same way as Example 1 except that a first current collector plate having the hole H3 and the slit S1 as shown in FIG. 10 was used as the first current collector plate located between the cap plate and the electrode assembly. The flame release area A was 44.9%. The connection portion 33*b* was 4 mm in width. The battery can coupling portion 33*a* had a tapered structure such that the minimum width was equal to the connection portion 33*b*. The ratio of the minimum width w4 (4 mm) to the maximum width w3 (14.65 mm) of the tapered structure was 0.27.

Example 7

Example 7 was carried out in the same way as Example 1 except that the first current collector plate had a thickness of 0.2 mm, and the flame release area A was 34.8%.

Example 8

Example 8 was carried out in the same way as Example 1 except that the outer diameter of the manufactured electrode assembly was 44.2 mm.

Example 9

Example 9 was carried out in the same way as Example 1 except that the outer diameter of the manufactured electrode assembly was 44.7 mm.

Example 10

Example 10 was carried out in the same way as Example 2 except that the cap plate included a vent portion configured to rupture at a pressure of 27 $kgf/cm^2$ or more.

Example 11

Figure 17:
FIG. 17 is a photographic image showing the electrode ejected from the central portion of the electrode assembly according to an Experimental Example.

Example 11 was carried out in the same way as Example 2 except that the cap plate included a vent portion configured to rupture at a pressure of 24 $kgf/cm^2$ or more. FIG. 17 is a photographic image showing the electrode ejected from the central portion of the electrode assembly.

Example 12

Example 12 was carried out in the same way as Example 2 except that the cap plate included a vent portion configured to rupture at a pressure of 21 $kgf/cm^2$ or more.

Example 13

Example 13 was carried out in the same way as Example 2 except that the cap plate included a vent portion configured to rupture at a pressure of 20 $kgf/cm^2$ or more.

The following TABLE 1 summarizes the vent pressure, the sealing tape condition, and the electrode assembly outer diameter, and the following TABLE 2 summarizes the current collector plate structure of the batteries manufactured in Examples 1 to 13.

TABLE 1

| | Vent | Sealing tape | | | Electrode Assembly |
| Ex. No. | pressure (kgf/cm²) | Material | Area (mm × mm) | Thickness (μm) | Outer Diameter (mm) |
|---|---|---|---|---|---|
| 1 | 15 | PU | 35 × 134 | 34 | 44.5 |
| 2 | 15 | PP | 63 × 134 | 30 | 44.5 |
| 3 | 15 | PU | 35 × 134 | 34 | 44.5 |
| 4 | 15 | PU | 35 × 134 | 34 | 44.5 |
| 5 | 15 | PU | 35 × 134 | 34 | 44.5 |
| 6 | 15 | PU | 35 × 134 | 34 | 44.5 |
| 7 | 15 | PU | 35 × 134 | 34 | 44.5 |
| 8 | 15 | PU | 35 × 134 | 34 | 44.2 |

TABLE 1-continued

| | Vent | Sealing tape | | | Electrode Assembly |
| Ex. No. | pressure (kgf/cm²) | Material | Area (mm × mm) | Thickness (μm) | Outer Diameter (mm) |
|---|---|---|---|---|---|
| 9 | 15 | PU | 35 × 134 | 34 | 44.7 |
| 10 | 27 | PP | 63 × 134 | 30 | 44.5 |
| 11 | 24 | PP | 63 × 134 | 30 | 44.5 |
| 12 | 21 | PP | 63 × 134 | 30 | 44.5 |
| 13 | 20 | PP | 63 × 134 | 30 | 44.5 |

TABLE 2

| | Current collector | | | | | |
| Ex. No. | Thickness (mm) | Flame release area (A) (%) | Connection portion width (mm) | Hole | Tapered structure | Slit |
|---|---|---|---|---|---|---|
| 1 | 0.3T | 34.8 | 6 | X | X | X |
| 2 | 0.3T | 34.8 | 6 | X | X | X |
| 3 | 0.3T | 36.1 | 6 | ○ | X | X |
| 4 | 0.3T | 47.2 | 4 | ○ | X | X |
| 5 | 0.3T | 44.3 | 4 | ○ | ○ | X |
| 6 | 0.3T | 44.9 | 4 | ○ | ○ | ○ |
| 7 | 0.2T | 34.8 | 6 | X | X | X |
| 8 | 0.3T | 34.8 | 6 | X | X | X |
| 9 | 0.3T | 34.8 | 6 | X | X | X |
| 10 | 0.3T | 34.8 | 6 | X | X | X |
| 11 | 0.3T | 34.8 | 6 | X | X | X |
| 12 | 0.3T | 34.8 | 6 | X | X | X |
| 13 | 0.3T | 34.8 | 6 | X | X | X |

The following TABLE 3 summarizes the ejection distance ratio when the electrode was ejected in the overcharge test of repeatedly charging and discharging the batteries of Examples 1 to 13 at the rate of 1.7 C. The ejection distance ratio is the ratio of distance between the ejected electrode assembly end portion and the second end portion of the battery can to the distance between the first and second end portions of the battery can. The ejection distance is an average value of repeated experiments. When the electrode was not ejected, the side rupture of the battery can occurred, and the side rupture of the battery can was marked as Fail.

TABLE 3

| Ex. No. | Ejection of electrode | Ejection distance ratio | Side rupture result of battery can | Spiral structure formation of ejected part | Central portion bulge of electrode assembly when ejected |
|---|---|---|---|---|---|
| 1 | X | — | 10/10ea Fail | — | — |
| 2 | X | — | 4/10ea Fail | — | — |
| 3 | X | — | 1/3ea Fail | — | — |
| 4 | X | — | 1/3ea Fail | — | — |
| 5 | NA | — | 0/6ea Fail | — | — |
| 6 | X | — | 1/6ea Fail | — | — |
| 7 | NA | — | 0/3ea Fail | — | — |
| 8 | X | — | 5/10ea Fail | — | — |
| 9 | X | — | 9/10ea Fail | — | — |
| 10 | ○ | 2 (160 mm/80 mm) | 0/5ea Fail | 5/5ea | 5/5ea |
| 11 | ○ | 1.75 (140 mm/80 mm) | 0/5ea Fail | 5/5ea | 5/5ea |
| 12 | ○ | 1.275 (102 mm/80 mm) | 1/5ea Fail | 0/5ea | 3/5ea |
| 13 | ○ | 1.125 (90 mm/80 mm) | 2/2ea Fail | 0/2ea | 0/5ea |

25                                                                 26

As can be seen from the above-described experimental results, in Examples 10 to 12, the vent pressure of the battery was 21 kgf/cm$^2$ or more, and the ejection distance ratio was 1.25 times or more. Compared to the other examples, the degree of side rupture of the battery can was extremely low. In particular, in Example 10 and Example 11, when the electrode assembly was ejected, the central portion of the electrode assembly bulged, the electrode assembly was ejected in a spiral structure, and the side rupture of the battery can did not occur in each of the five repeated experiments.

LIST OF REFERENCE NUMERALS

1: Lithium secondary battery
2: Pack housing
3: Battery pack
5: Vehicle
10: Electrode assembly
11: Negative electrode plate uncoated portion
11a: Segment
12: Positive electrode plate uncoated portion
H1: Winding center hole
20: Battery can
E1: Battery can first end portion
E2: Battery can second end portion
E0: Electrode assembly end portion
21: Beading portion
22: Crimping portion
30: First current collector plate
H2: Current collector plate hole
31: Support portion
32: Tab coupling portion
33: Battery can coupling portion
33a: Coupling portion
33b: Connection portion
H3: Support portion hole
S1: Support portion slit
40: Cap plate
41, 201: Vent portion
G1: Sealing gasket
50: Battery terminal
G2: Insulation gasket
T1: First electrode terminal
T2: Second electrode terminal
P: Second current collector plate
S: Insulator
42a: Protruding portion
42c: Connection plate
45: Lead
80: Sealing tape
H3: Support portion hole
211: Negative electrode plate
210: Positive electrode plate
212: Separator
220: Current collector
221: Active material layer
222: Uncoated portion

The invention claimed is:

1. A lithium secondary battery comprising a battery can, an electrode assembly and an electrolyte received in the battery can, and a cap plate configured to seal the battery can, wherein the battery can comprises a first end portion and a second end portion opposite the first end portion,
wherein the electrode assembly is cylindrical in shape, wherein the lithium secondary battery is configured such that at least a portion of the electrode assembly is ejected through the first end portion of the battery can when an internal pressure within the battery can is 21 kgf/cm$^2$ to 29 kgf/cm$^2$, and wherein after the portion of the electrode assembly is ejected through the first end portion of the battery can, a distance from an end portion of the electrode assembly located farthest away from the battery can to the second end portion of the battery can is 1.25 times to 3 times a distance between the first end portion and the second end portion of the battery can.

2. The lithium secondary battery according to claim 1, wherein the lithium secondary battery is configured such that the portion of the electrode assembly is ejected through the first end of the battery can:
a) without or before thermal runaway of the lithium secondary battery; or
b) without or before side rupture of the battery can.

3. The lithium secondary battery according to claim 1, wherein the first end portion of the battery can includes a vent portion, or
wherein the cap plate is secured to the first end portion of the battery can, and the cap plate includes a vent portion.

4. The lithium secondary battery according to claim 3, wherein the lithium secondary battery is configured such that the portion of the electrode assembly is ejected through the first end portion of the battery can after destruction of a structure securing the cap plate to the first end portion of the battery can or after rupture of the vent portion.

5. The lithium secondary battery according to claim 1, wherein the cap plate includes a vent portion, and
wherein the vent portion is configured to rupture when the internal pressure is 21 kgf/cm$^2$ to 29 kgf/cm$^2$.

6. The lithium secondary battery according to claim 5, wherein the vent portion is configured to rupture when the internal pressure is more than 25 kgf/cm$^2$ and less than 29 kgf/cm$^2$.

7. The lithium secondary battery according to claim 1, wherein the lithium secondary battery comprises a first current collector plate between the first end portion of the battery can and the electrode assembly.

8. The lithium secondary battery according to claim 7, wherein the first current collector plate comprises a battery can coupling portion having a tapered structure.

9. The lithium secondary battery according to claim 7, wherein a flame release area ranges from 30% to 50% based on a total open area of the first end portion of the battery can.

10. The lithium secondary battery according to claim 7, wherein the first current collector plate is configured to break when the portion of the electrode assembly is ejected through the first end portion of the battery can.

11. The lithium secondary battery according to claim 1, wherein a diameter-to-height ratio of the lithium secondary battery is 0.4 or more.

12. The lithium secondary battery according to claim 1, wherein the lithium secondary battery is a 46110 cell, a 4875 cell, a 48110 cell, a 4880 cell, a 4680 cell, or a 4695 cell.

13. The lithium secondary battery according to claim 1, wherein a thickness of a side of the battery can ranges from 0.1 mm to 0.4 mm.

14. The lithium secondary battery according to claim 1, wherein the electrode assembly is a jellyroll-type electrode assembly including a positive electrode plate and a negative electrode plate wound with a separator interposed between the positive electrode plate and the negative electrode plate, and wherein after the portion of the electrode assembly is ejected through the first end portion of the battery can, the electrode assembly has a spiral structure.

15. The lithium secondary battery according to claim 14, wherein a sealing tape including polypropylene is attached to an outermost end portion of the electrode assembly.

16. The lithium secondary battery according to claim 14, wherein the positive electrode plate and the negative electrode plate each include an uncoated portion where an active material layer is not formed, and wherein at least part of the uncoated portion of the positive electrode plate or the negative electrode plate defines an electrode tab.

17. The lithium secondary battery according to claim 16, wherein the positive electrode plate uncoated portion and the negative electrode plate uncoated portion are respectively formed at an end portion of the positive electrode plate and the negative electrode plate along a direction in which the electrode assembly is wound, wherein a first current collector plate is coupled to the positive electrode plate uncoated portion and a second current collector plate is coupled to the negative electrode plate uncoated portion, and wherein the first current collector plate and the second current collector plate are each connected to an electrode terminal.

18. The lithium secondary battery according to claim 17, wherein each of the positive electrode plate uncoated portion and the negative electrode plate uncoated portion is shaped into a plurality of independently bendable segments, and wherein at least part of the plurality of independently bendable segments are bent toward a winding center of the electrode assembly.

19. A battery pack comprising the lithium secondary battery according to claim 1.

20. An electric vehicle comprising the battery pack according to claim 19 as a power source.

\* \* \* \* \*